(12) United States Patent
Ohashi et al.

(10) Patent No.: US 11,871,008 B2
(45) Date of Patent: Jan. 9, 2024

(54) TRANSMITTING APPARATUS, RECEIVING APPARATUS, AND TRANSMISSION SYSTEM

(71) Applicant: Sony Semiconductor Solutions Corporation, Kanagawa (JP)

(72) Inventors: Kazuki Ohashi, Tokyo (JP); Yoshiaki Matsubara, Kanagawa (JP); Hideyuki Someya, Tokyo (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 240 days.

(21) Appl. No.: 17/610,210

(22) PCT Filed: May 19, 2020

(86) PCT No.: PCT/JP2020/019710
§ 371 (c)(1),
(2) Date: Nov. 10, 2021

(87) PCT Pub. No.: WO2020/261816
PCT Pub. Date: Dec. 30, 2020

(65) Prior Publication Data
US 2022/0224917 A1    Jul. 14, 2022

(30) Foreign Application Priority Data
Jun. 28, 2019    (JP) .................................. 2019-121343

(51) Int. Cl.
*H04N 19/167* (2014.01)
*H04N 19/172* (2014.01)
*G06T 7/11* (2017.01)
*H04N 25/44* (2023.01)
*G06F 16/783* (2019.01)

(52) U.S. Cl.
CPC .............. *H04N 19/167* (2014.11); *G06T 7/11* (2017.01); *H04N 19/172* (2014.11); *H04N 25/44* (2023.01); *G06F 16/7847* (2019.01)

(58) Field of Classification Search
CPC .... H04N 19/167; H04N 19/172; H04N 25/44; H04N 9/73; H04N 21/234345;
(Continued)

(56) References Cited

U.S. PATENT DOCUMENTS

2009/0067626 A1* 3/2009 Dufaux ............ H04N 21/23476
380/217
2010/0158099 A1* 6/2010 Kalva .................. H04N 19/115
375/240.01
(Continued)

FOREIGN PATENT DOCUMENTS

EP    3301910 A1    4/2018
EP    3709662 A1    9/2020
(Continued)

OTHER PUBLICATIONS

International Search Report (PCT/ISA/210), International Application No. PCT/JP2020/019710, dated Jul. 10, 2020.

*Primary Examiner* — Marnie A Matt
(74) *Attorney, Agent, or Firm* — Michael Best & Friedrich LLP

(57) ABSTRACT

It is an object to provide a transmitting apparatus, a receiving apparatus, and a transmission system that are capable of performing an image quality adjustment process on a partial region of interest (ROI) segmented from a captured image. The transmitting apparatus includes a controlling section that controls acquisition of image quality adjusting information including information for use in adjusting image quality of each of a plurality of ROIs, and a transmitting section that sends out image data of the plurality of ROIs as payload data and sends out ROI information of each of the plurality of ROIs as embedded data.

18 Claims, 14 Drawing Sheets

(58) Field of Classification Search
CPC ......... H04N 21/23614; H04N 21/4223; H04N 21/44008; H04N 21/440245; H04N 21/4728; H04N 23/60; H04N 23/71; H04N 23/73; H04N 23/76; H04N 21/23418; G06T 7/11; G06F 16/7847
USPC ...................................................... 375/240.08
See application file for complete search history.

(56) References Cited

U.S. PATENT DOCUMENTS

| | | | |
|---|---|---|---|
| 2016/0191931 A1* | 6/2016 | Hannuksela ............ | H04N 19/70 375/240.12 |
| 2019/0116330 A1 | 4/2019 | Isobe | |
| 2020/0275046 A1* | 8/2020 | Takahashi ............ | H04N 19/167 |

FOREIGN PATENT DOCUMENTS

| | | | | |
|---|---|---|---|---|
| ES | 2895927 T3 | * | 2/2022 | ........... H04N 19/119 |
| JP | 2004-187124 A | | 7/2004 | |
| JP | 2008-171732 A | | 7/2008 | |
| JP | 2012-209831 A | | 10/2012 | |
| JP | 2013-164834 A | | 8/2013 | |
| JP | 2014-039219 A | | 2/2014 | |
| JP | 2016-201756 A | | 12/2016 | |
| JP | 2016-206310 A | | 12/2016 | |
| WO | WO-2016167142 A1 | | 10/2016 | |
| WO | 2018/225449 A1 | | 12/2018 | |
| WO | WO-2019092952 A1 | | 5/2019 | |

* cited by examiner

FRAME HEADER AREA R1
- FRAME NUMBER F1
- NUMBER OF ROIS 4
- ROI INFORMATION

| REGION NUMBER 1 | REGION NUMBER 2 |
|---|---|
| PHYSICAL REGION LENGTH (XLa1, YLa1) | PHYSICAL REGION LENGTH (XLa2, YLa2) |
| RECTANGULAR OUTPUT REGION LENGTH (XLb1, YLb1) | RECTANGULAR OUTPUT REGION LENGTH (XLb2, YLb2) |
| PRIORITY 1 | PRIORITY 2 |
| EXPOSURE INFORMATION h1 | EXPOSURE INFORMATION h2 |
| GAIN INFORMATION g1 | GAIN INFORMATION g2 |
| AD WORD LENGTH L1 | AD WORD LENGTH L2 |
| IMAGE FORMAT FM1 | IMAGE FORMAT FM1 |
| REGION NUMBER 3 | REGION NUMBER 4 |
| PHYSICAL REGION LENGTH (XLa3, YLa3) | PHYSICAL REGION LENGTH (XLa4, YLa4) |
| RECTANGULAR OUTPUT REGION LENGTH (XLb3, YLb3) | RECTANGULAR OUTPUT REGION LENGTH (XLb4, YLb4) |
| PRIORITY 3 | PRIORITY 4 |
| EXPOSURE INFORMATION h3 | EXPOSURE INFORMATION h4 |
| GAIN INFORMATION g3 | GAIN INFORMATION g4 |
| AD WORD LENGTH L3 | AD WORD LENGTH L4 |
| IMAGE FORMAT FM1 | IMAGE FORMAT FM1 |

PACKET AREA R2

112b

TRANSMITTING APPARATUS, RECEIVING APPARATUS, AND TRANSMISSION SYSTEM

TECHNICAL FIELD

The present disclosure relates to a transmitting apparatus, a receiving apparatus, and a transmission system.

BACKGROUND ART

In recent years, there have been growing applications in which large amounts of data are transmitted in bulk. Such applications tend to pose large loads on the transmission system, possibly causing the transmission system to go down in worst-case scenarios and fail to perform data transmission.

To avoid transmission system shutdowns, it has been known in the art to specify an object as an imaging target and transmit only a partial image of the specified object that has been segmented, rather than transmitting an entire captured image (see, for example, PTL 1 through PTL 4). Moreover, PTL 5 discloses a technology in which hues are accurately expressed for clearer images by the automatic adjustment of white balance.

CITATION LIST

Patent Literature

[PTL 1]
  Japanese Patent Laid-open No. 2016-201756
[PTL 2]
  Japanese Patent Laid-open No. 2014-39219
[PTL 3]
  Japanese Patent Laid-open No. 2013-164834
[PTL 4]
  Japanese Patent Laid-open No. 2012-209831
[PTL 5]
  Japanese Patent Laid-open No. 2008-171732

SUMMARY

Technical Problem

Nothing has been examined about an image quality adjustment process such as white balance in a case where a partial region of interest (ROI) segmented from a captured image is transmitted.

It is an object of the present disclosure to provide a transmitting apparatus, a receiving apparatus, and a transmission system that are capable of performing an image quality adjustment process on a partial region of interest (ROI) segmented from a captured image.

Solution to Problem

A transmitting apparatus according to an aspect of the present disclosure includes a controlling section that controls acquisition of image quality adjusting information including information for use in adjusting image quality of each of a plurality of ROIs (Regions of Interest), and a transmitting section that sends out image data of the plurality of ROIs as payload data and sends out ROI information of each of the plurality of ROIs as embedded data.

A receiving apparatus according to an aspect of the present disclosure includes a receiving section that receives a transmission signal including image data of a plurality of ROIs (Regions Of Interest) in payload data and including ROI information of each of the plurality of ROIs in embedded data, a controlling section that controls extraction of image quality adjusting information including information for use in adjusting image quality of the plurality of ROIs from the transmission signal received by the receiving section, and a processing section that performs an adjustment of the image quality of the plurality of ROIs using the image quality adjusting information extracted by the controlling section.

A transmission system according to an aspect of the present disclosure includes a transmitting apparatus including a controlling section that controls acquisition of image quality adjusting information including information for use in adjusting image quality of each of a plurality of ROIs (Regions of Interest), and a transmitting section that sends out image data of the plurality of ROIs as payload data and sends out ROI information of each of the plurality of ROIs as embedded data, and a receiving section that receives a transmission signal including image data of a plurality of ROIs (Regions Of Interest) in payload data and including ROI information of each of the plurality of ROIs in embedded data, a controlling section that controls extraction of image quality adjusting information including information for use in adjusting image quality of the plurality of ROIs from the transmission signal received by the receiving section, and a processing section that performs an adjustment of the image quality of the plurality of ROIs using the image quality adjusting information extracted by the controlling section.

BRIEF DESCRIPTION OF DRAWINGS

FIG. 12 is a diagram illustrating a configurational example of transmission data where the positional information of ROI images is included in the payload data of a long packet.

DESCRIPTION OF EMBODIMENTS

Modes for carrying out the present disclosure will be described in detail hereinbelow with reference to the drawings. The description given below applies to specific examples of the present disclosure, and the present disclosure is not limited to the aspects illustrated below.

The modes for carrying out the technology according to the present disclosure (hereinafter referred to as "embodiments") will be described hereinbelow in the following order:

1. Technology 1 that is presupposed for the present disclosure (technology for transmitting a partial region (rectangular in shape) of interest (ROI) segmented from a captured image)
2. Technology 2 that is presupposed for the present disclosure (technology for transmitting a partial region (non-rectangular in shape) of interest (ROI) segmented from a captured image)
3. A transmitting apparatus, a receiving apparatus, and a transmission system according to an embodiment of the present disclosure
4. Principles of an image quality adjusting process in a transmitting apparatus, a receiving apparatus, and a transmission system according to a modification of the embodiment of the present disclosure

1. Technology 1 that is Presupposed for the Present Disclosure

[Configuration]

In recent years, portable devices such as smartphones and camera devices have been handling progressively larger quantities of image data, and are required to speed up and consume less electric power for data transmission within themselves or between different devices. In order to meet such requirements, standardization is under way for high-speed interface standards such as C-PHY standards and D-PHY standards established by MIPI Alliance as connection interfaces for potable deices and camera devices. The C-PHY standards and D-PHY standards are interface standards for physical layers (PHY) of communication protocols. In addition, DSI for the displays of portable devices and CSI for camera devices are present as higher protocol layers than the C-PHY standards and D-PHY standards.

Figure 1:
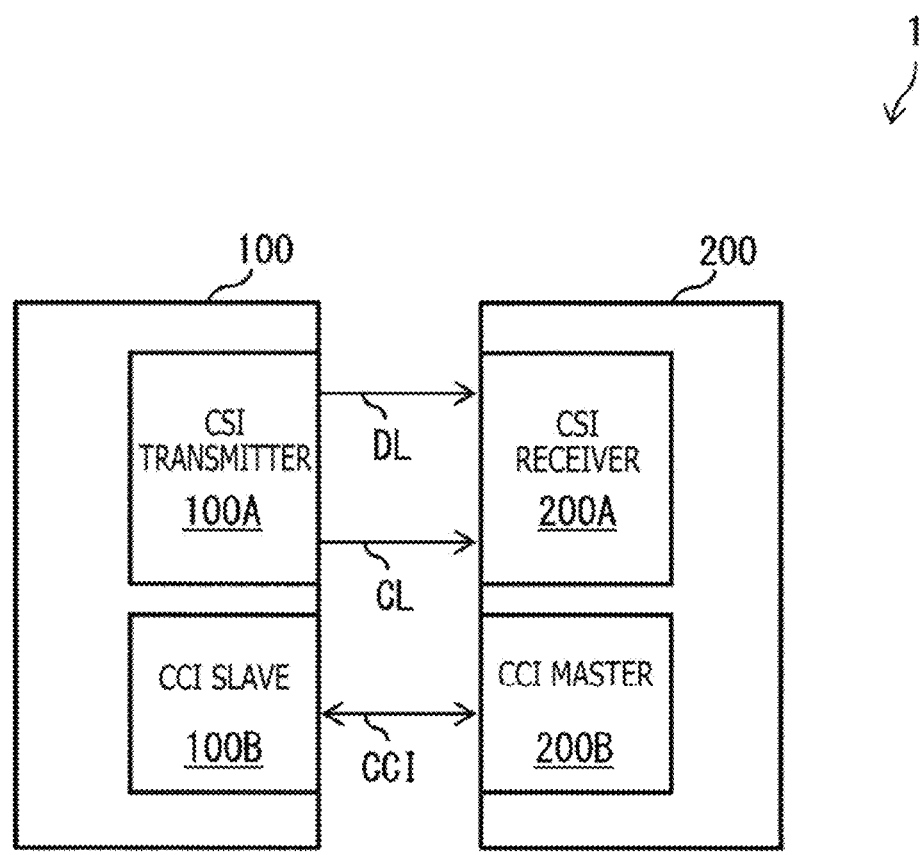
FIG. 1 is a diagram illustrating a general configurational example of a video transmission system.

A video transmission system 1 according to the technology that is presupposed for the present disclosure includes a system for transmitting and receiving signals according to various standards, and can transmit and receive signals according to the MIPI CSI-2 standards, the MIPI CSI-3 standards, or the MIPI DSI standards, for example. FIG. 1 illustrates a general configuration of the video transmission system 1 according to the technology that is presupposed for the present disclosure. The video transmission system 1 is applied to the transmission of data signals, clock signals, and control signals, and includes a video transmitting apparatus 100 and a video receiving apparatus 200. The video transmission system 1 includes a data lane DL for transmitting data signals representing image data etc., a clock lane CL for transmitting clock signals, and a camera control interface CCI for transmitting control signals, for example, between the video transmitting apparatus 100 and the video receiving apparatus 200. Though FIG. 1 illustrates an example in which one data lane DL is provided, a plurality of data lanes DL may be provided. The camera control interface CCI includes a bidirectional control interface compatible with the $I^2C$ (Inter-Integrated Circuit) standards.

The video transmitting apparatus 100 includes an apparatus for sending out signals according to the MIPI CSI-2 standards, the MIPI CSI-3 standards, or the MIPI DSI standards. The video transmitting apparatus 100 has a CSI transmitter 100A and a CCI slave 100B. The video receiving apparatus 200 has a CSI receiver 200A and a CCI master 200B. In the clock lane CL, the CSI transmitter 100A and the CSI receiver 200A are connected to each other by a clock signal line. In the data lane DL, the CSI transmitter 100A and the CSI receiver 200A are connected to each other by a clock signal line. In the camera control interface CCI, the CCI slave 100B and the CCI master 200B are connected to each other by a control signal line.

The CSI transmitter 100A includes a differential signal transmitting circuit for generating a differential clock signal as a clock signal and outputting the generated differential clock signal to the clock signal line, for example. The CSI transmitter 100A may not necessarily transmit a differential signal, but may transmit a single-ended or three-phase signal. The CSI transmitter 100A also includes a differential signal transmitting circuit for generating a differential data signal as a data signal and outputting the generated differential data signal to the data signal line, for example. The CSI receiver 200A includes a differential signal receiving circuit for receiving a differential clock signal as a clock signal and performing a predetermined processing process on the received differential clock signal. The CSI receiver 200A also includes a differential signal receiving circuit for receiving a differential data signal as a data signal and performing a predetermined processing process on the received differential data signal.

(Video Transmitting Apparatus 100)

Figure 2:
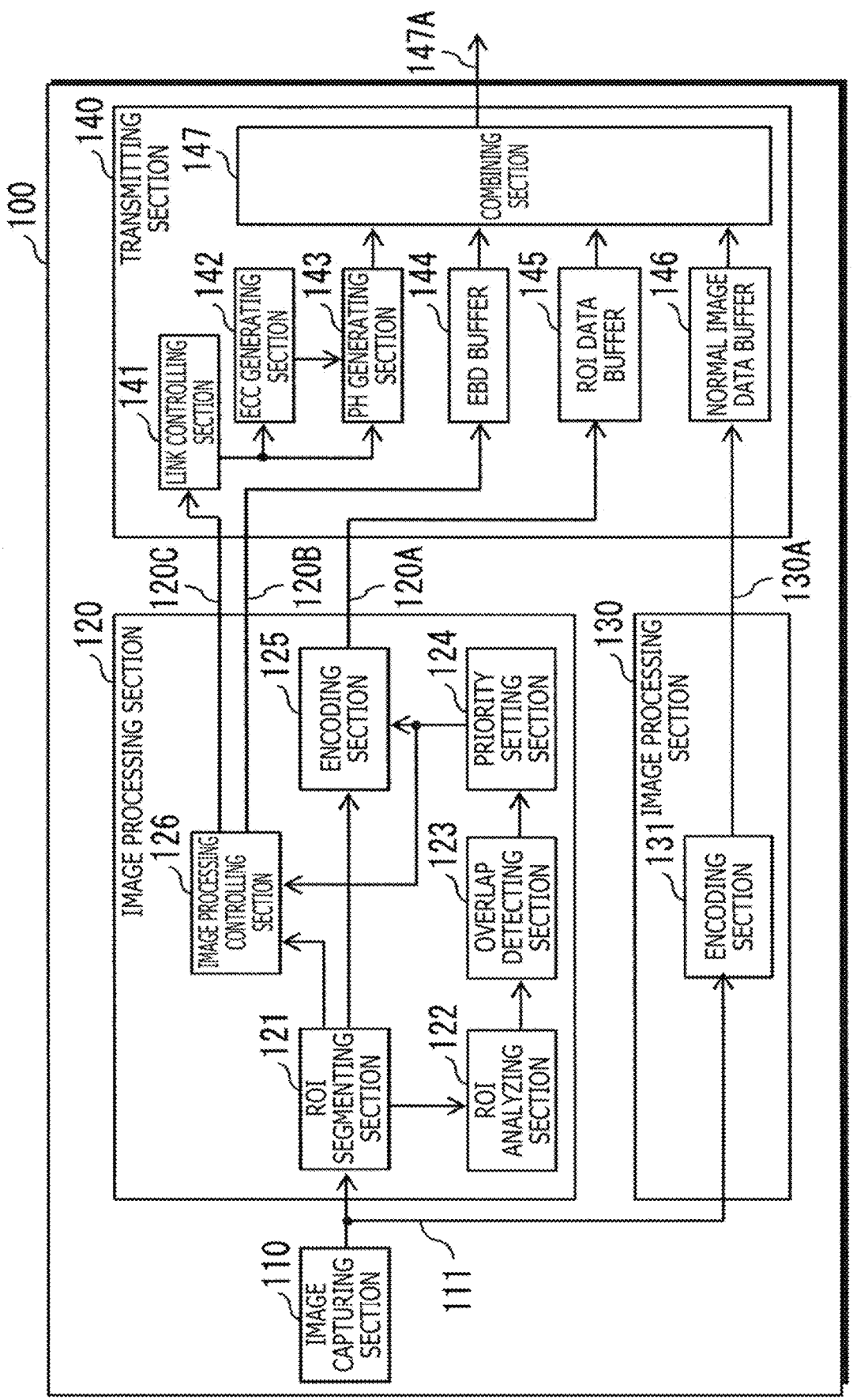
FIG. 2 is a diagram illustrating a general configurational example of a video transmitting apparatus illustrated in FIG. 1.
Figure 3:
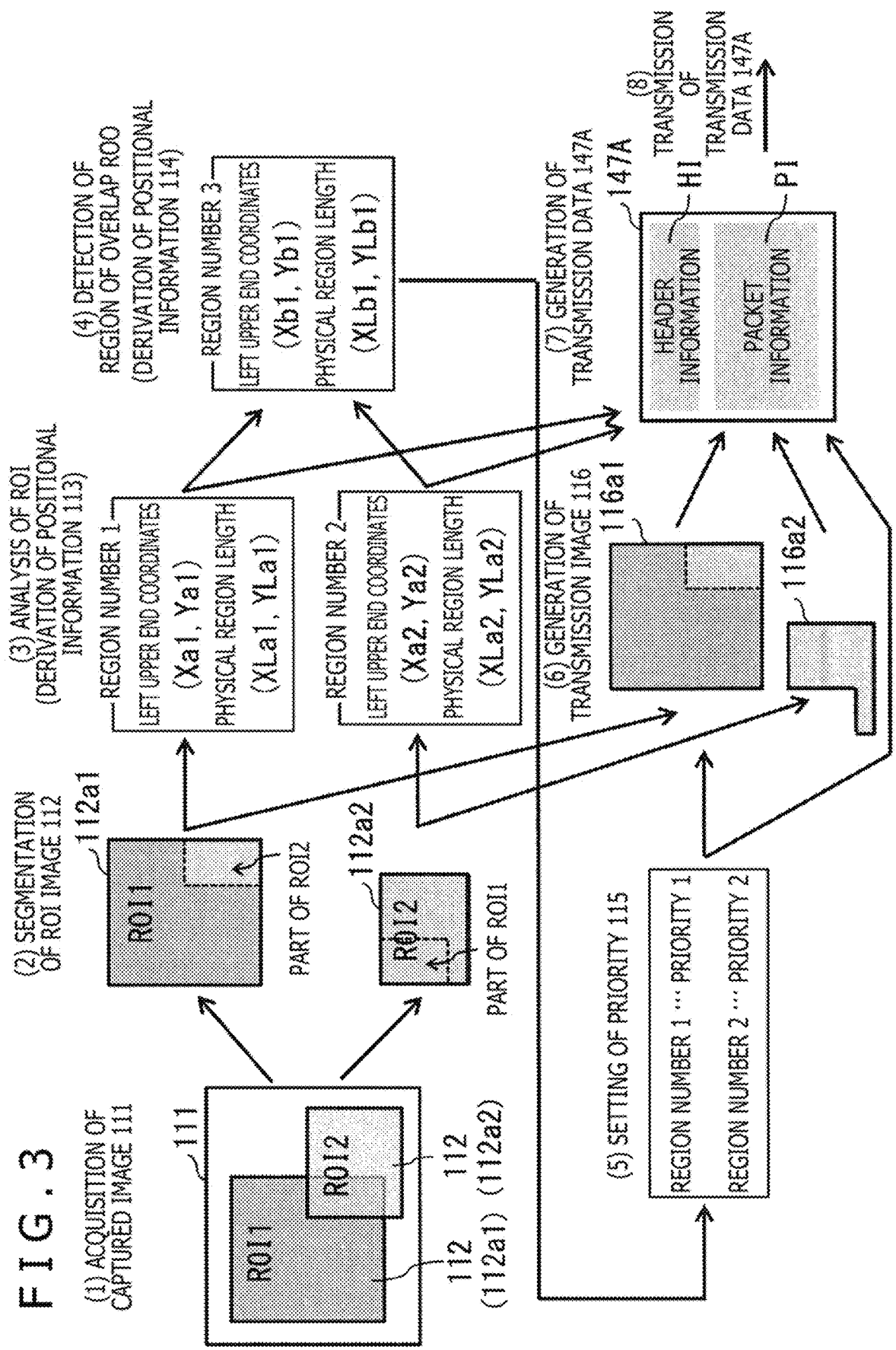
FIG. 3 is a diagram illustrating an example of a procedure for generating transmission data when two ROIs are included in a captured image.

FIG. 2 illustrates a configurational example of the video transmitting apparatus 100. The video transmitting apparatus 100 corresponds to a specific example of the CSI transmitter 100A. The video transmitting apparatus 100 includes an image capturing section 110, image processing sections 120 and 130, and a transmitting section 140, for example. The video transmitting apparatus 100 transmits transmission data 147A generated by performing a predetermined processing process on a captured image 111 obtained by the image capturing section 110 through the data line DL to the video receiving apparatus 200. FIG. 3 illustrates an example of a procedure for generating the transmission data 147A.

The image capturing section 110 converts an optical image obtained through an optical lens into image data, for example. The image capturing section 110 includes a CCD (Charge Coupled Device) image sensor or a CMOS (Complementary Metal Oxide Semiconductor) image sensor. The image capturing section 110 has an analog-to-digital converting circuit that converts analog image data into digital image data. The converted image data may be of a YCbCr data format that represents the colors of pixels with a luminance component Y and color difference components Cb and Cr, or may be of a RGB data format. The image capturing section 110 outputs the captured image 111 (digital image data) obtained by image capturing to the image processing section 120.

The image processing section 120 includes a circuit for performing a predetermined processing process on the captured image 111 input from the image capturing section 110. According to the presupposed technology 1, the image processing section 120 performs a predetermined processing process on the captured image 111 input from the image capturing section 110 in a case where a control signal instructing the image processing section 120 to segment ROIs is input from the video receiving apparatus 200 through the camera control interface CCI. However, the presupposed technology 1 is also applicable where the video transmitting apparatus 100, i.e., the transmission side, determines coordinates for segmenting ROIs. In this case, the transmission side receives information representing "persons" or "objects" to be acquired by ROIs sent out from the reception side, and makes a decision and determines segmenting coordinates, for example. The video receiving apparatus 200 thus generates various kinds of data (120A, 120B and 120C) and outputs them to the transmitting section 140. The image processing section 130 includes a circuit for performing a predetermined processing process on the captured image 111 input from the image capturing section 110. The image processing section 130 performs a predetermined processing process on the captured image 111 input from the image capturing section 110 in a case where a control signal instructing the image processing section 130 to output normal images is input from the video receiving apparatus 200 through the camera control interface CCI. The image processing section 130 thus generates image data 130A and outputs them to the transmitting section 140.

The image processing section 130 has an encoding section 131, for example. The encoding section 131 encodes the captured image 111 to generate compressed image data 130A. The image processing section 130 compresses the captured image 111 in a compression format that conforms to the JPEG (Joint Photographic Experts Group) standards, for example, as the format of the compressed image data 130A.

The image processing section 120 has a ROI segmenting section 121, a ROI analyzing section 122, an overlap detecting section 123, a priority setting section 124, an encoding section 125, and an image processing controlling section 126, for example.

The ROI segmenting section 121 specifies an image or a plurality of images as an imaging target or targets included in the captured image 111 input from the image capturing section 110, and establishes a region of interest ROI per specified object. A region of interest ROI refers to a square-shaped region including a specified object, for example. The ROI segmenting section 121 specifies an image of each region of interest ROI (for example, a ROI image 112 in FIG. 3) from the captured image 111. The ROI segmenting section 121 further assigns a region number as an identifier to each established region of interest ROI. For example, in a case where the ROI segmenting section 121 has established two regions of interest ROI in the captured image 111, the ROI segmenting section 121 assigns a region number 1 to one of the regions of interest ROI (for example, a region of interest ROI1 in FIG. 3) and assigns a region number 2 to the other region of interest ROI (for example, a region of interest ROI2 in FIG. 3). The ROI segmenting section 121 stores the assigned identifiers (region numbers) in a storage section, for example. For example, the ROI segmenting section 121 stores each ROI image 112 segmented from the captured image 111 in the storage section. Furthermore, for example, the ROI segmenting section 121 stores the identifier (region number) assigned to each region of interest ROI, in the storage section in association with the ROI image 112.

The ROI analyzing section 122 derives positional information 113 of each region of interest ROI in the captured image 111. The positional information 113 includes, for example, the left upper end coordinates (Xa, Ya) of the region of interest ROI, the length in an X-axis direction of the region of interest ROI, and the length in a Y-axis direction of the region of interest ROI. The length in the X-axis direction of the region of interest ROI refers, for example, to the physical region length XLa in the X-axis direction of the region of interest ROI. The length in the Y-axis direction of the region of interest ROI refers, for example, to the physical region length YLa in the Y-axis direction of the region of interest ROI. The physical region length represents the physical length, i.e., data length, of the region of interest ROI. The positional information 113 may include the coordinates of a position different from the left upper end of the region of interest ROI. The ROI analyzing section 122 stores the derived positional information in the storage section, for example. The ROI analyzing section 122 stores the derived positional information in the storage section in association with the identifier, i.e., region number, assigned to the region of interest ROI.

The ROI analyzing section 122 may further derive, as the positional information 113 per region of interest ROI, the output region length XLc in the X-axis direction of the region of interest ROI and the output region length YLc in the Y-axis direction of the region of interest ROI, for example. The output region length represents the physical length, i.e., data length, of the region of interest ROI after the resolution of the region of interest ROI has been changed by a decimating process or an addition of pixels, for example. The ROI analyzing section 122 may derive, for example, as the positional information 113 per region of interest ROI, sensing information, exposure information, gain information, AD (Analog-Digital) word length, image format, etc., for example, and store them in the storage section. The sensing information refers to the contents of calculations about objects included in the region of interest ROI and additional information of a subsequent signal processing process on the ROI image 112. The exposure information refers to an exposure time of the region of interest ROI. The gain information refers to gain information of the region of interest ROI. The AD word length refers to the word length of data per pixel AD-converted in the region of interest ROI. The image format refers to the format of the image of the region of interest ROI. The ROI analyzing section 122 may, for example, derive the number of regions of interest ROI (the number of ROIs) included in the captured image 111 and store the number of ROIs in the storage section.

When a plurality of objects is specified as imaging targets in the captured image 111, the overlap detecting section 123 detects a region of overlap (ROO (Region of Overlap)) where two or more regions of interest ROI overlap each other on the basis of the positional information 113 of a plurality of regions of interest ROI in the captured image 111. Specifically, the overlap detecting section 123 derives positional information 114 of each region of overlap ROO in the captured image 111.

The overlap detecting section 123 stores the derived positional information 114 in the storage section, for example. For example, the overlap detecting section 123 stores the derived positional information 114 in the storage section in corresponding relation to the region of overlap ROO. The region of overlap ROO refers to a square-shaped region identical or smaller in size to the smallest region of interest ROI among two or more regions of interest ROI that overlap each other. The positional information 114 includes, for example, the left upper end coordinates (Xb, Yb) of the region of overlap ROO, the length in the X-axis direction of the region of overlap ROO, and the length in the Y-axis direction of the region of overlap ROO. The length in the X-axis direction of the region of overlap ROO refers, for example, to the physical region length XLb. The length in the Y-axis direction of the region of overlap ROO refers, for example, to the physical region length YLb. The positional information 114 may include the coordinates of a position different from the left upper end of the region of interest ROI.

The priority setting section 124 assigns a priority 115 to each region of interest ROI in the captured image 111. The priority setting section 124 stores the assigned priority 115 in the storage section, for example. For example, the priority setting section 124 stores the assigned priority 115 in the storage section in corresponding relation to the region of interest ROI. The priority setting section 124 may assign a priority 115 to each region of interest ROI separately from the region number assigned to each region of interest ROI, or may use the region number assigned to each region of interest ROI instead of a priority 115. The priority setting section 124 may, for example, store the priority 115 in the storage section in association with the region of interest ROI or may store the region number assigned to each region of interest ROI in the storage section in association with the region of interest ROI.

The priority 115 refers to an identifier of each region of interest ROI, and represents discriminating information for discriminating which one of a plurality of regions of interest ROI in the captured image 111 a region of overlap ROO has been eliminated from. For example, the priority setting section 124 assigns "1" as a priority 115 to one of two regions of interest ROI each including a region of overlap ROO and assigns "2" as a priority 115 to the other region of interest ROI. In this case, a region of overlap ROO is eliminated with respect to a region of interest ROI where the numerical value of the priority 115 is larger in generating a transmission image 116 to be described later. Incidentally, the priority setting section 124 may assign the same number as the region number assigned to each region of interest ROI as a priority 115 to the region of interest ROI. For example, the priority setting section 124 stores the priority 115 assigned to each region of interest ROI in the storage section in association with the ROI image 112.

The encoding section 125 encodes each transmission image 116 to generate compressed image data 120A. The encoding section 125 compresses each transmission image 116 in a compression format that conforms to the JPEG standards, for example, as the format of the compressed image data 120A. Before performing the above compression process, the encoding section 125 generates each transmission image 116. In order that an image 118 of a region of overlap ROO will not overlappingly be included in a plurality of ROI images 112 obtained from the captured image 111, the encoding section 125 generates a plurality of transmission images 116 where the image 118 has been eliminated from the plurality of ROI images 112 obtained from the captured image 111.

The encoding section 125 determines which one of a plurality of ROI images 112 the image 118 is to be eliminated from, on the basis of the priority 115 assigned to each region of interest ROI, for example. The encoding section 125 may determine, for example, which one of a plurality of ROI images 112 the image 118 is to be eliminated from, by using the region number assigned to each region of interest ROI as a priority 115. The encoding section 125 uses the ROI image 112 as specified above from which the image 118 has been eliminated as a transmission image 116 (for example, a transmission image 116a2 in FIG. 3). The encoding section 125 uses the ROI image 112 that does not include a region of overlap ROO or the ROI image 112 which the image 118 has not been eliminated from as determined above, as a transmission image 116 (for example, a transmission image 116a1 in FIG. 3).

The image processing controlling section 126 generates ROI information 120B and frame information 120C and transmits them to the transmitting section 140. The ROI information 120B includes each positional information 113, for example. Furthermore, the ROI information 120B includes at least one of the data type of each region of interest ROI, the number of regions of interest ROI included in the captured image 111, the region number (or the priority 115) of each region of interest ROI, the data length of each region of interest ROI, and the image format of each region of interest ROI. The frame information 120C includes the number of a virtual channel assigned to each frame, the data type of each region of interest ROI, the payload length per line, etc., for example. The data type includes YUV data, RGB data, or RAW data, for example. Furthermore, the data type includes data of the ROI format, data of the normal format, etc., for example. The payload length represents the number of pixels included in the payload of a long packet, e.g., the number of pixels per region of interest ROI. The payload refers to major data (application data) transmitted between the video transmitting apparatus 100 and the video receiving apparatus 200. The long packet refers to a packet disposed between a packet header PH and a packet footer PF.

The transmitting section 140 includes a circuit for generating and sending out transmission data 147A on the basis of various kinds of data (data 120A, 120B, 120C and 130A) input from the image processing sections 120 and 130. The transmitting section 140 sends out the ROI information 120B regarding each region of interest ROI in the captured image 111 as embedded data. Furthermore, in a case where a control signal indicating the segmentation of ROIs is input from the video receiving apparatus 200 via the camera control interface CCI, the transmitting section 140 sends out the image data (compressed image data 120A) of each region of interest ROI as the payload data of a long packet. At this time, the transmitting section 140 sends out the image data (compressed image data 120A) of each region of interest ROI in a common virtual channel. Furthermore, the transmitting section 140 sends out the image data (compressed image data 120A) of each region of interest ROI as an image data frame, and sends out the ROI information 120B regarding each region of interest ROI as the header of an image data frame. Furthermore, in a case where a control signal indicating the outputting of a normal image is input from the video receiving apparatus 200 via the camera control interface CCI, the transmitting section 140 sends out normal image data (compressed image data 130A) as the payload data of a long packet.

The transmitting section 140 has a LINK controlling section 141, an ECC generating section 142, a PH generating section 143, an EBD buffer 144, a ROI data buffer 145, a normal image data buffer 146, and a combining section 147. In a case where a control signal indicating the segmentation of ROIs is input from the video receiving apparatus 200 via the camera control interface CCI, the LINK controlling section 141, the ECC generating section 142, the PH generating section 143, the EBD buffer 144, and the ROI data buffer 145 output data to the combining section 147. In a case where a control signal indicating the outputting of a normal image is input from the video receiving apparatus 200 via the camera control interface CCI, the normal image data buffer 146 outputs data to the combining section 147.

It is noted that the ROI data buffer 145 may doubles as the normal image data buffer 146. In this case, the transmitting section 140 may have a selector for selecting the output from either one of the ROI data buffer 145 and the ROI data buffer 145, between the output terminals of the ROI data buffer 145 and the ROI data buffer 145 and an input terminal of the combining section 147.

Figure 4:
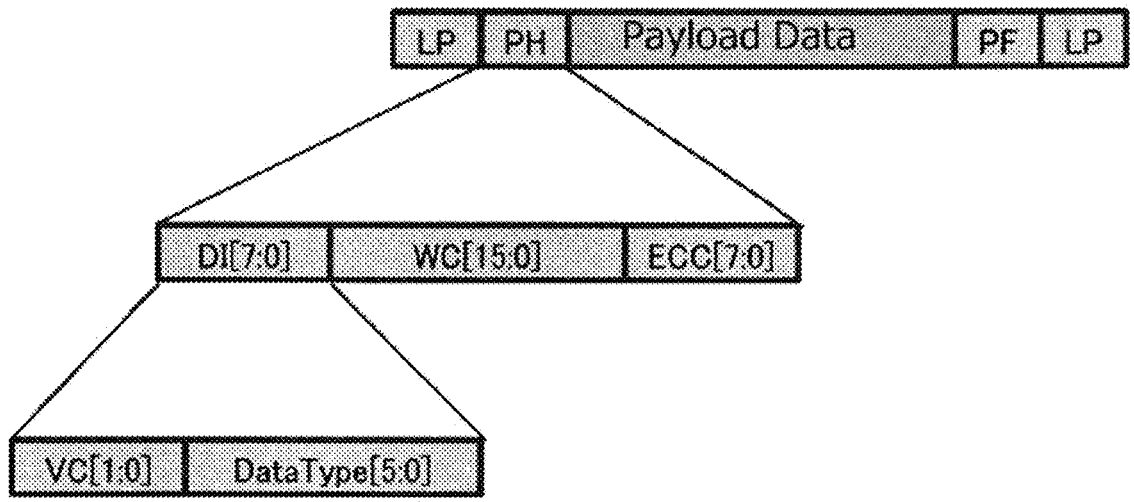
FIG. 4 is a diagram illustrating a configurational example of a packet header.

The LINK controlling section 141 outputs the frame information 120C per line to the LINK controlling section 141 and the ECC generating section 142, for example. The ECC generating section 142 generates an error correcting code for a line in the frame information 120C, for example, on the basis of the data of the line, e.g., the number of the virtual channel, the data type of each region of interest ROI, the payload length per line, etc. The ECC generating section 142 outputs the generated error correcting code to the PH generating section 143, for example. The PH generating section 143 generates a packet header PH per line using the frame information 120C and the error correcting code generated by the ECC generating section 142, for example. At this time, as illustrated in FIG. 4, for example, the packet header PH includes a packet header of the payload data of a long packet. The packet header PH includes DI, WC, and ECC, for example. WC represents an area for indicating the end of a packet with the number of words to the video receiving apparatus 200. WC includes a payload length, for example, and includes the number of pixels per region of interest ROI, for example. ECC represents an area for storing a value for correcting a bit error. ECC includes an error correcting code. DI represents an area for storing a data identifier. DI includes the number of a VC (virtual channel) and DataType (data type of each region of interest ROI). VC (virtual channel) refers to a concept introduced for flow control of packets and represents a mechanism for supporting a plurality of independent data streams that shares one link. The PH generating section 143 outputs the generated packet header PH to the combining section 147.

The EBD buffer 144 primarily stores ROI information 120B and outputs the ROI information 120B as embedded data to the combining section 147. The embedded data refer to additional information that can be embedded in the header or footer of an image data frame (see FIG. 5 to be described later). The embedded data include ROI information 120B, for example.

The ROI data buffer 145 primarily stores compressed image data 120A and outputs the compressed image data 120A at predetermined timing as the payload data of a long packet to the combining section 147. In a case where a control signal indicating the segmentation of ROIs is input from the video receiving apparatus 200 via the camera control interface CCI, the ROI data buffer 145 outputs the compressed image data 120A as the payload data of a long packet to the combining section 147. The normal image data buffer 146 primarily stores compressed image data 130A and outputs the compressed image data 130A at predetermined timing as the payload data of a long packet to the combining section 147. In a case where a control signal indicating the outputting of a normal image is input from the video receiving apparatus 200 via the camera control interface CCI, the normal image data buffer 146 outputs the compressed image data 130A as the payload data of a long packet to the combining section 147.

In a case where a control signal indicating the outputting of a normal image is input from the video receiving apparatus 200 via the camera control interface CCI, the combining section 147 generates transmission data 147A on the basis of input data (compressed image data 130A). The combining section 147 outputs the generated transmission data 147A to the video receiving apparatus 200 via the data lane DL. On the other hand, in a case where a control signal indicating the segmentation of ROIs is input from the video receiving apparatus 200 via the camera control interface CCI, the combining section 147 generates transmission data 147A on the basis of various input data (a packet header PH, ROI information 120B, and compressed image data 120A). The combining section 147 outputs the generated transmission data 147A to the video receiving apparatus 200 via the data lane DL. Specifically, the combining section 147 includes DataType (data type of each region of interest ROI) in the packet header PH of the payload data of a long packet and sends out the data. Furthermore, the combining section 147 sends out image data (compressed image data 120A) of each region of interest ROI in a common virtual channel.

Figure 5:
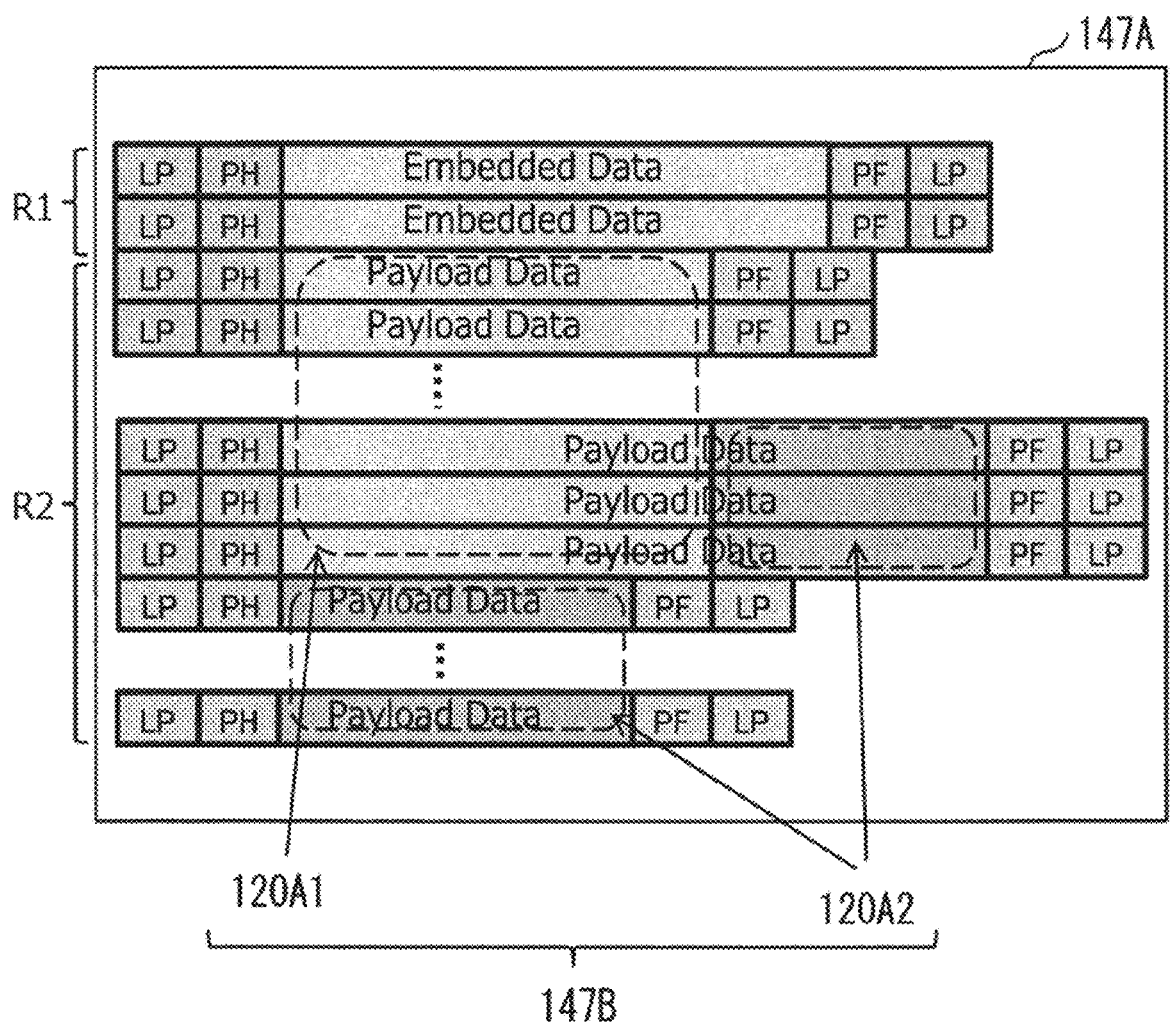
FIG. 5 is a diagram illustrating a configurational example of transmission data.

The transmission data 147A include an image data frame as illustrated in FIG. 5, for example. The image data frame normally has a header area, a packet area, and a footer area. In FIG. 5, the footer area is omitted from illustration for the sake of convenience. The frame header area R1 of the transmission data 147A includes embedded data. At this time, the embedded data include ROI information 120B. In FIG. 5, the packet area R2 of the transmission data 147A includes the payload data of a long packet per line, and also include a packet header PH and a packet footer PF at positions sandwiching the payload data of a long packet. Furthermore, the packet area R2 includes low power modes LP at positions sandwiching the packet header PH and the packet footer PF.

At this time, the packet header PH includes DI, WC, and ECC, for example. WC includes a payload length, for example, and includes the number of pixels per region of interest ROI, for example. ECC includes an error correcting code. DI includes the number of a VC (virtual channel) and DataType (data type of each region of interest ROI). According to the present embodiment, the number of a common virtual channel is assigned to a VC of each line. In FIG. 5, the packet area R2 of the transmission data 147A includes compressed image data 147B. The compressed image data 147B includes one compressed image data 120A or a plurality of compressed image data 120A. Here in FIG. 5, a packet group closer to the packet header PH includes compressed image data 120A (120A1) of the transmission image 116a1 in FIG. 3, and a packet group remoter from the packet header PH includes compressed image data 120A (120A2) of the transmission image 116a2 in FIG. 3. These two compressed image data 120A1 and 120A2 make up the compressed image data 147B. The payload data of a long packet of each line include one line of pixel data in the compressed image data 147B.

Figure 6:
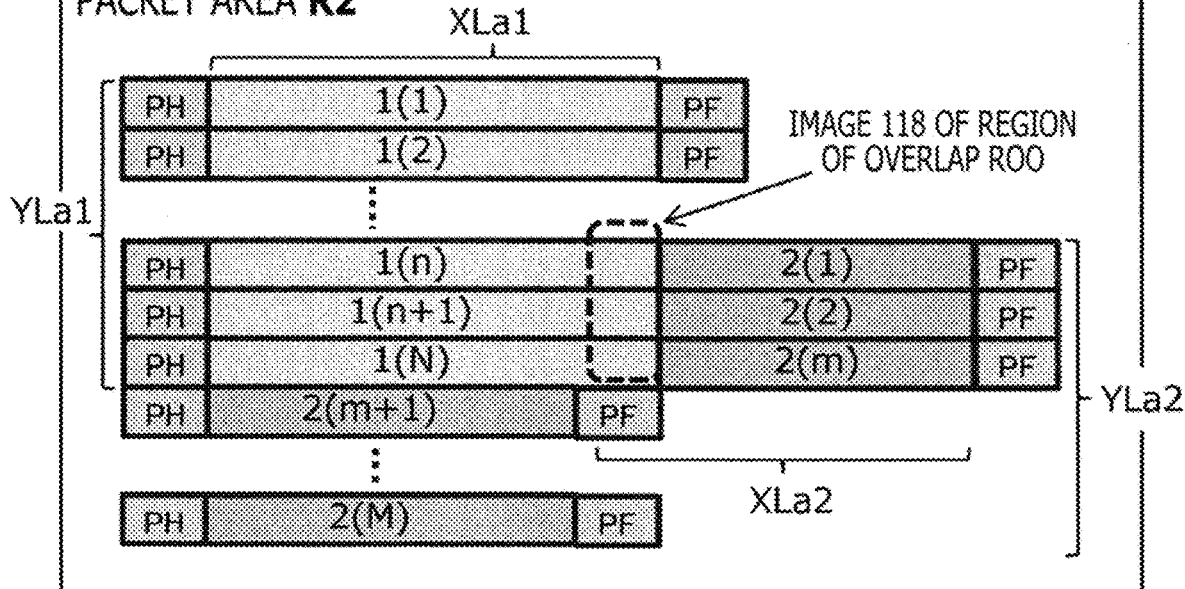
FIG. 6 is a diagram illustrating a configurational example of transmission data.

FIG. 6 illustrates a configurational example of the transmission data 147A. The transmission data 147A include a frame header area R1 and a packet area R2, for example. Incidentally, FIG. 6 illustrates details of the contents of the frame header area R1. Furthermore, low power modes LP are omitted from illustration in FIG. 6.

The frame header area R1 includes a frame number F1 as an identifier of the transmission data 147A, for example. The frame header area R1 includes information regarding compressed image data 147B included in the packet area R2. The frame header area R1 includes, for example, the number of compressed image data 120A (the number of ROIs) included in the compressed image data 147B and information regarding the ROI image 112 (ROI information 120B) corresponding to each compressed image data 120A included in the compressed image data 147B.

The combining section 147 divides and places compressed image data 147B per pixel row of compressed image data 120A in the packet area R2 of the transmission data 147A, for example. Therefore, the packet area R2 of the transmission data 147A does not include overlapping compressed image data corresponding to an image 118 of a region of overlap ROO. Furthermore, the combining section 147 has eliminated therefrom a pixel row not corresponding to each transmission image 116 of the captured image 111 in the packet area R2 of the transmission data 147A, for example. Consequently, the packet area R2 of the transmission data 147A does not include a pixel row not corresponding to each transmission image 116 of the captured image 111. Incidentally, in the packet area R2 in FIG. 6, a zone surrounded by the broken line corresponds to compressed image data of an image 118 of a region of overlap ROO.

The boundary between a packet group closer to the packet header PH (for example, 1(n) in FIG. 6) and a packet group remoter from the packet header PH (for example, 2(1) in FIG. 6) is specified by the physical region length XLa1 of the ROI image 112 corresponding to the compressed image data of the packet group closer to the packet header PH (for example, 1(n) in FIG. 6). A packet starting position in the compressed image data corresponding to an image 118 of a region of overlap ROO included in a packet group closer to the packet header PH (for example, 1(n) in FIG. 6) is specified by the physical region length XLa2 of the ROI image 112 corresponding to a packet group remoter from the packet header PH (for example, 2(1) in FIG. 6).

Figure 7:
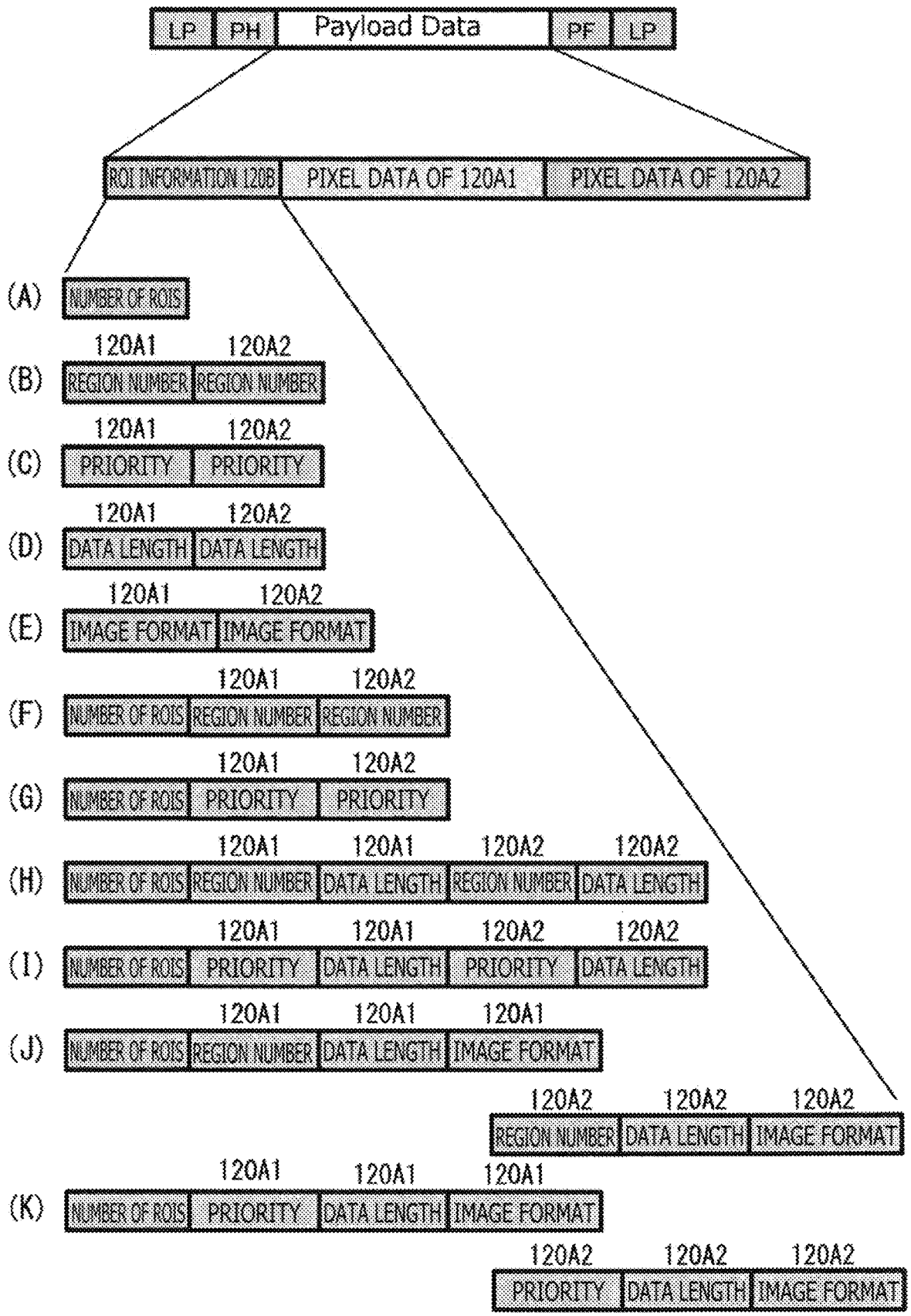
FIG. 7 is a diagram illustrating a configurational example of the payload data of a long packet.

When the payload data of a long packet is to be generated per line in the packet area R2 of the transmission data 147A, for example, the combining section 147 may include ROI information 120B, as illustrated in FIG. 7, for example, other than pixel data of one line in the compressed image data 147B, in the payload data of the long packet. In other words, the combining section 147 may include ROI information 120B in the payload data of a long packet and output the data. At this time, as illustrated in FIG. 7(A) to FIG. 7(K), the ROI information 120B includes at least one of the number of regions of interest ROI (the number of ROIs) included in the captured image 111, the region number (or the priority 115) of each region of interest ROI, the data length of each region of interest ROI, and the image format of each region of interest ROI. The ROI information 120B should preferably be placed in the payload data of a long packet at the end on the packet header PH side (i.e., the leading end of the payload data of the long packet).

(Video Receiving Apparatus 200)

Figure 8:
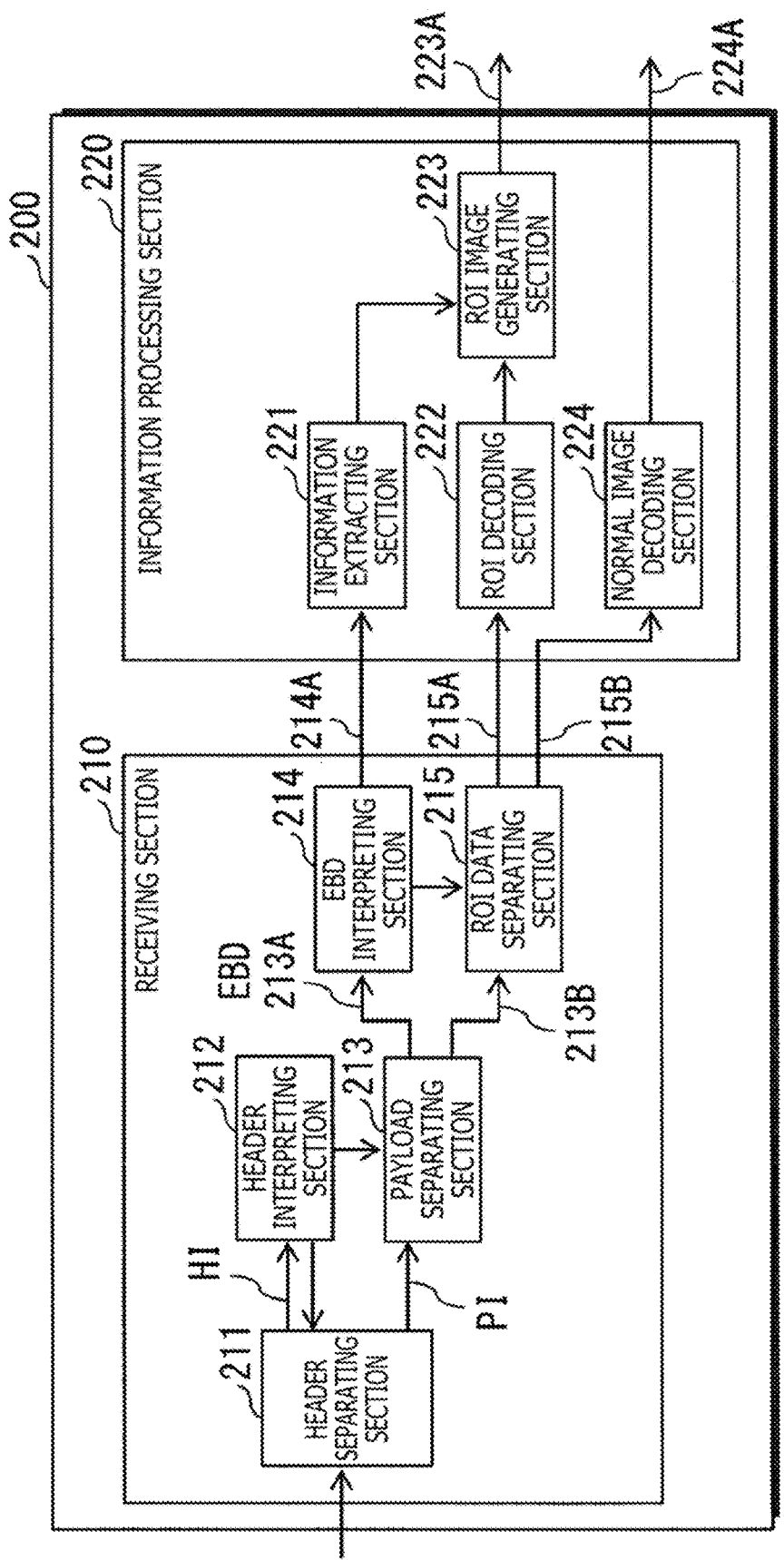
FIG. 8 is a diagram illustrating a general configurational example of a video receiving apparatus illustrated in FIG. 1.
Figure 9:
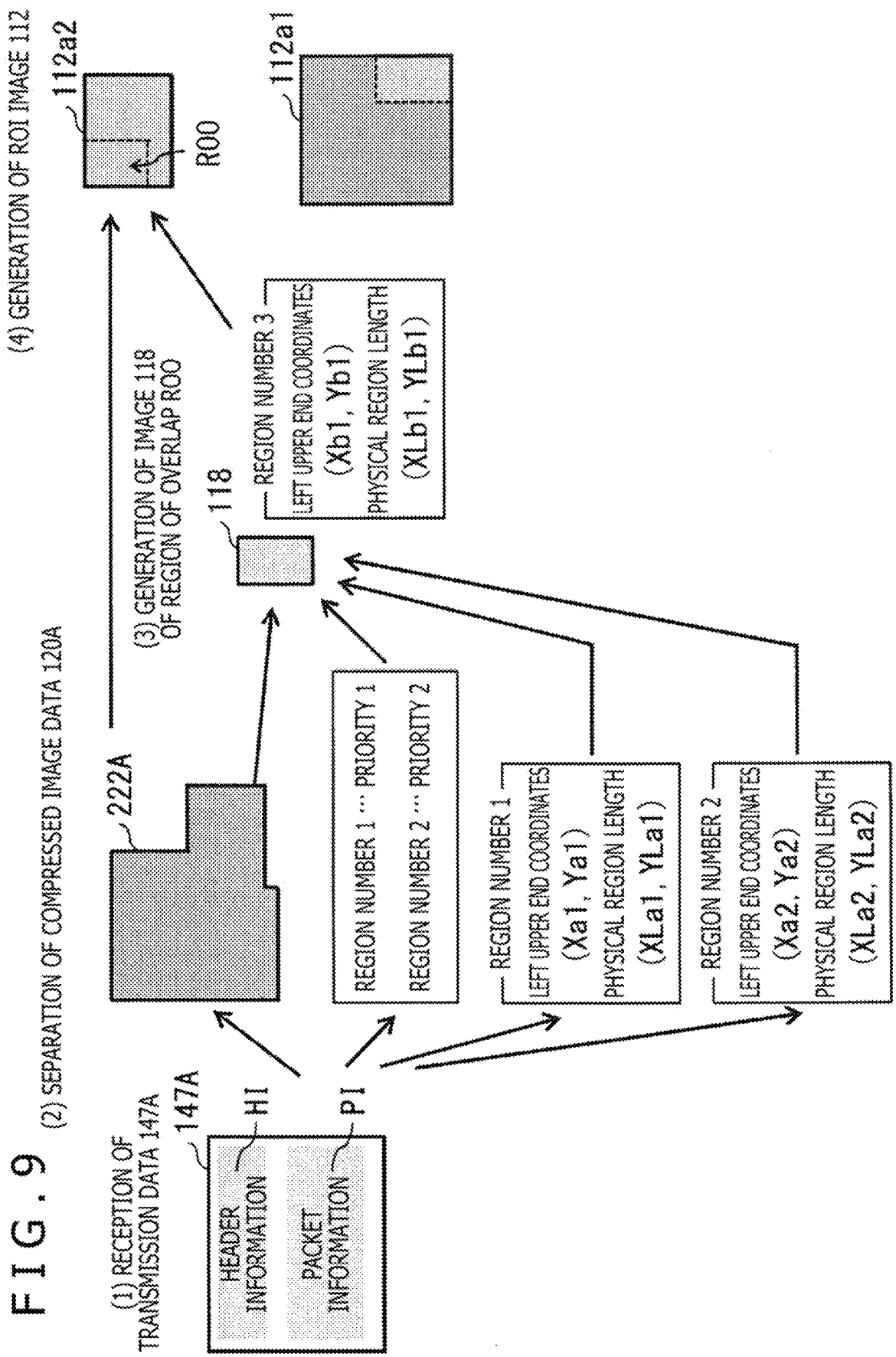
FIG. 9 is a diagram illustrating an example of a procedure for generating two ROI images included in a captured image when two images are included in transmission data.

Next, the video receiving apparatus 200 will be described below. FIG. 8 illustrates a configurational example of the video receiving apparatus 200. FIG. 9 illustrates an example of a procedure for generating a ROI image 223A in the video receiving apparatus 200. The video receiving apparatus 200 includes an apparatus for receiving signals according to standards common to the video transmitting apparatus 100 (for example, the MIPI CSI-2 standards, the MIPI CSI-3 standards, or the MIPI DSI standards). The video receiving apparatus 200 has a receiving section 210 and an information processing section 220. The receiving section 210 includes a circuit for receiving transmission data 147A output from the video transmitting apparatus 100 via the data lane DL, performing a predetermined process on the received transmission data 147A to generate various kinds of data (214A, 215A and 215B), and outputting the generated data to the information processing section 220. The information processing section 220 includes a circuit for generating a ROI image 223A based on various kinds of data (214A and 215A) received from the receiving section 210 and generating a normal image 224A based on data (215B) received from the receiving section 210.

The receiving section 210 has, for example, a header separating section 211, a header interpreting section 212, a payload separating section 213, an EBD interpreting section 214, and a ROI data separating section 215.

The header separating section 211 receives transmission data 147A from the video transmitting apparatus 100 via the data lane DL. Specifically, the header separating section 211 receives transmission data 147A including ROI information 120B regarding each region of interest ROI in the captured image 111 in embedded data and also including image data (compressed image data 120A) of each region of interest ROI in the payload data of a long packet. The header separating section 211 separates the received transmission data 147A into a frame header area R1 and a packet area R2. The header interpreting section 212 specifies the positions of the payload data of long packets included in the packet area R2 on the basis of data (specifically, embedded data) included in the frame header area R1. The payload separating section 213 separates the payload data of the long packets included in the packet area R2 from the packet area R2 on the basis of the positions of the payload data of the long packets that have been specified by the header interpreting section 212.

The EBD interpreting section 214 outputs the embedded data as EBD data 214A to the information processing section 220. Furthermore, the EBD interpreting section 214 discriminates whether the image data included in the payload data of the long packets are the compressed image data 120A of the image data 116 of a ROI or the compressed image data 130A of normal image data, from the data type included in the embedded data. The EBD interpreting section 214 outputs the discriminated result to the ROI data separating section 215.

If the image data included in the payload data of the long packets are the compressed image data 120A of the image data 116 of a ROI, then the ROI data separating section 215 outputs the payload data of the long packet as payload data 215A to the information processing section 220 (specifically, a ROI decoding section 222). If the image data included in the payload data are the compressed image data 130A, then the ROI data separating section 215 outputs the payload data of the long packet as payload data 215A to the information processing section 220 (specifically, a normal image decoding section 224). In a case where the payload data of the long packet include the ROI information 120B, the payload data 215A include the ROI information 120B and one line of pixel data of the compressed image data 147B.

The information processing section 220 extracts the ROI information 120B from the embedded data included in the EBD data 214A. The information processing section 220 extracts an image of each region of interest ROI (ROI image 112) in the captured image 111 from the payload data of the long packet included in the transmission data 147A received by the receiving section 210 on the basis of the ROI information 120B extracted by an information extracting section 221. The information processing section 220 has, for example, the information extracting section 221, the ROI decoding section 222, a ROI image generating section 223, and the normal image decoding section 224.

The normal image decoding section 224 decodes the payload data 215B to generate a normal image 224A. The ROI decoding section 222 decodes the compressed image data 147B included in the payload data 215A to generate image data 222A. The image data 222A represent one transmission image 116 or a plurality of transmission images 116.

The information extracting section 221 extracts the ROI information 120B from the embedded data included in the EBD data 214A. For example, the information extracting section 221 extracts the number of regions of interest ROI included in the captured image 111, the region number (or the priority 115) of each region of interest ROI, the data length of each region of interest ROI, and the image format of each region of interest ROI, for example, from the embedded data included in the EBD data 214A. In other words, the transmission data 147A include the region number (or the priority 115) of a region of interest ROI corresponding to each transmission image 116 as discriminating information for discriminating which one of a plurality of transmission images 116 obtained from the transmission data 147A an image 118 of a region of overlap ROO has been eliminated from.

The ROI image generating section 223 detects a region of overlap ROO where two or more regions of interest ROI overlap each other on the basis of the ROI information 120B obtained by the information extracting section 221.

The information extracting section 221 extracts, for example, coordinates (for example, left upper end coordinates (Xa1, Ya1)), lengths (for example, physical region lengths XLa1 and YLa1), and a region number 1 (or a priority 115 (=1)) of a region of interest ROI corresponding to a ROI image 112a1 from the embedded data included in the EBD data 214A. Furthermore, the information extracting section 221 extracts, for example, coordinates (for example, left upper end coordinates (Xa2, Ya2)), lengths (for example, physical region lengths XLa2, YLa2), and a region number 2 (or a priority 115 (=2)) of a region of interest ROI corresponding to a ROI image 112a2 from the embedded data included in the EBD data 214A.

At this time, the ROI image generating section 223 derives positional information 114 of the region of overlap ROO based on these extracted pieces of information (hereinafter referred to as "extracted information 221A"). The ROI image generating section 223 derives, for example, coordinates (for example, left upper end coordinates Xb1, Yb1) and lengths (for example, physical region lengths XLb1 and YLb1) of the region of overlap ROO as the positional information 114 of the region of overlap ROO.

Incidentally, the ROI image generating section 223 may acquire the ROI information 120B from the payload data 215A instead of acquiring the ROI information 120B from the embedded data included in the EBD data 214A. In this case, the ROI image generating section 223 may detect a region of overlap ROO where two or more regions of interest ROI overlap each other on the basis of the ROI information 120B included in the payload data 215A. Furthermore, the ROI image generating section 223 may extract the extracted information 221A from the ROI information 120B included in the payload data 215A, and may derive the positional information 114 of a region of overlap ROO based on the extracted information 221A thus extracted.

Moreover, the ROI image generating section 223 generates an image (ROI images 112a1 and 112a2) of each region of interest ROI in the captured image 111 on the basis of the image data 222A, the extracted information 221A, and the positional information 114 of the region of overlap ROO. The ROI image generating section 223 outputs the generated images as a ROI image 223A.

[Procedure]

Next, an example of a procedure for transmitting data in the video transmission system 1 will be described below with reference to FIGS. 3 and 9.

First, the image capturing section 110 outputs a captured image 111 (digital image data) obtained by image capturing to the image processing section 120. The ROI segmenting section 121 specifies two regions of interest ROI1 and ROI2 included in the captured image 111 input from the image capturing section 110. The ROI segmenting section 121 segments images of the respective regions of interest ROI1 and ROI2 (ROI images 112a1 and 112a2) from the captured image 111. The ROI segmenting section 121 assigns a region number 1 as an identifier to the region of interest ROI1 and assigns a region number 2 as an identifier to the region of interest ROI2.

The ROI analyzing section 122 derives positional information 113 of each region of interest ROI in the captured image 111. The ROI analyzing section 122 derives left upper coordinates (Xa1, Ya1) of the region of interest ROI1, a length (XLa1) in the X-axis direction of the region of interest ROI1, and a length (YLa1) in the Y-axis direction of the region of interest ROI1 on the basis of the region of interest ROI1. The ROI analyzing section 122 derives left upper coordinates (Xa2, Ya2) of the region of interest ROI2, a length (XLa2) in the X-axis direction of the region of interest ROI2, and a length (YLa2) in the Y-axis direction of the region of interest ROI2 on the basis of the region of interest ROI2.

The overlap detecting section 123 detects a region of overlap ROO where the two regions of interest ROI1 and ROI2 overlap each other on the basis of the positional information 113 of the two regions of interest ROI1 and ROI2 in the captured image 111. Specifically, the overlap detecting section 123 derives positional information 114 of the region of overlap ROO in the captured image 111. The overlap detecting section 123 derives left upper coordinates (Xb1, Yb1) of the region of overlap ROO, a length (XLb1) in the X-axis direction of the region of overlap ROO, and a length (YLb1) in the Y-axis direction of the region of overlap ROO as the positional information 114 of the region of overlap ROO in the captured image 111.

The priority setting section 124 assigns "1" as a priority 115 to the region of interest ROI1 that is one of the two regions of interest ROI1 and ROI2, and assigns "2" as a priority 115 to the other region of interest ROI2.

The encoding section 125 generates two transmission images 116a1 and 116a2 where an image 118 of the region of overlap ROO has been eliminated from the two ROI images 112a1 and 112a2 obtained from the captured image 111, in order that the image 118 will not overlappingly be included in the two regions of interest ROI1 and ROI2.

The encoding section 125 determines which one of the two ROI images 112a1 and 112a2 the image 118 is to be eliminated from on the basis of region numbers (or the priority 115) of the two regions of interest ROI1 and ROI2. The encoding section 125 eliminates the image 118 from the ROI image 112a2 corresponding to the region of interest ROI2 whose region number (or the priority 115) is larger among the two regions of interest ROI1 and ROI2, thereby generating a transmission image 116a2. The encoding section 125 uses the ROI image 112a1 itself corresponding to the region of interest ROI1 whose region number (or the priority 115) is smaller among the two regions of interest ROI1 and ROI2, as a transmission image 116a1.

The image processing controlling section 126 generates ROI information 120B and frame information 120C and transmits them to the transmitting section 140. The transmitting section 140 generates transmission data 147A based on various kinds of data (120A, 120B, 120C and 130A) input from the image processing sections 120 and 130. The transmitting section 140 sends out the generated transmission data 147A to the video receiving apparatus 200 via the data lane DL.

The receiving section 210 receives the transmission data 147A output from the video transmitting apparatus 100 via the data lane DL. The receiving section 210 performs a predetermined process on the received transmission data 147A to generate EBD data 214A and payload data 215A and outputs them to the information processing section 220.

The information extracting section 221 extracts ROI information 120B from the embedded data included in the EBD data 214A. The information extracting section 221 extracts coordinates (for example, left upper end coordinates (Xa1, Ya1)), lengths (for example, physical region lengths XLa1 and YLa1), and a region number 1 (or a priority 115 (=1)) of the region of interest ROI corresponding to the ROI image 112a1 from the embedded data included in the EBD data 214A. Furthermore, the information extracting section 221 extracts coordinates (for example, left upper end coordinates (Xa2, Ya2)), lengths (for example, physical region lengths XLa2, YLa2), and a region number 2 (or a priority 115 (=2)) of the region of interest ROI corresponding to the ROI image 112a2 from the embedded data included in the EBD data 214A. The ROI decoding section 222 decodes the compressed image data 147B included in the payload data 215A to generate image data 222A.

The ROI image generating section 223 derives the positional information 114 of the region of overlap ROO based on the extracted pieces of information (extracted information 221A). The ROI image generating section 223 extracts, for example, coordinates (for example, left upper end coordinates Xb1, Yb1) and lengths (for example, physical region lengths XLb1 and YLb1) of the region of overlap ROO as the positional information 114 of the region of overlap ROO. Furthermore, the ROI image generating section 223 generates an image (ROI images 112a1 and 112a2) of each region of interest ROI in the captured image 111 on the basis of the image data 222A, the extracted information 221A, and the positional information 114 of the region of overlap ROO.

[Advantages]

Next, advantages of the video transmission system 1 according to the present embodiment will be described below.

In recent years, there have been growing applications in which large amounts of data are transmitted in bulk. Such applications tend to pose large loads on the transmission system, possibly causing the transmission system to go down in worst-case scenarios and fail to perform data transmission.

To avoid transmission system shutdowns, it has customary in the art to specify an object as an imaging target and transmit only a partial image of the specified object that has been segmented, rather than transmitting an entire captured image.

Incidentally, MIPI CS1-2 may be used as a process of transmitting data from an image sensor to an application sensor. It may not be easy to transmit ROIs according to this process due to various limitations.

On the other hand, according to the present embodiment, ROI information 120B regarding each region of interest ROI in the captured image 111 is sent out as embedded data, and image data of each region of interest ROI are sent out as the payload data of a long packet. Therefore, an apparatus (video receiving apparatus 200) that has received transmission data 147A sent out from the video transmitting apparatus 100 can easily extract the image data (ROI image 112) of each region of interest ROI from the transmission data 147A. As a result, it is possible to transmit regions of interest ROIs regardless of various limitations.

According to the present embodiment, furthermore, the image data (compressed image data 120A) of each region of interest ROI are sent out in a common virtual channel. Since a plurality of ROI images 112 can thus be sent in one packet, it is not necessary to enter an LP mode while the plurality of ROI images 112 is being sent, resulting in a high transmission efficiency.

According to the present embodiment, moreover, a data type of each region of interest ROI is included in the packet header PH of the payload data of the long packet and sent. Therefore, the data type of each region of interest ROI can be obtained simply by accessing the packet header PH of the payload data of the long packet, rather than accessing the embedded data. Inasmuch as this increases the processing rate of the video receiving apparatus 200, a high transmission efficiency can be achieved.

According to the present embodiment, furthermore, in a case where the ROI information 120B is included in the payload data of a long packet and sent, the ROI information 120B can be obtained simply by accessing the payload data of the long packet, rather than accessing the embedded data. Inasmuch as this increases the processing rate of the video receiving apparatus 200, a high transmission efficiency can be achieved.

According to the present embodiment, moreover, the ROI information 120B regarding each region of interest ROI is extracted from the embedded data included in the transmission data 147A and an image of each region of interest ROI (ROI image 112) is extracted from the payload data of the long packet include in the transmission data 147A on the basis of the extracted ROI information 120B. This allows the image of each region of interest ROI (ROI image 112) to be easily extracted from the transmission data 147A. As a result, it is possible to transmit regions of interest ROIs regardless of various limitations.

2. Technology 2 that is Presupposed for the Present Disclosure

Figure 10:
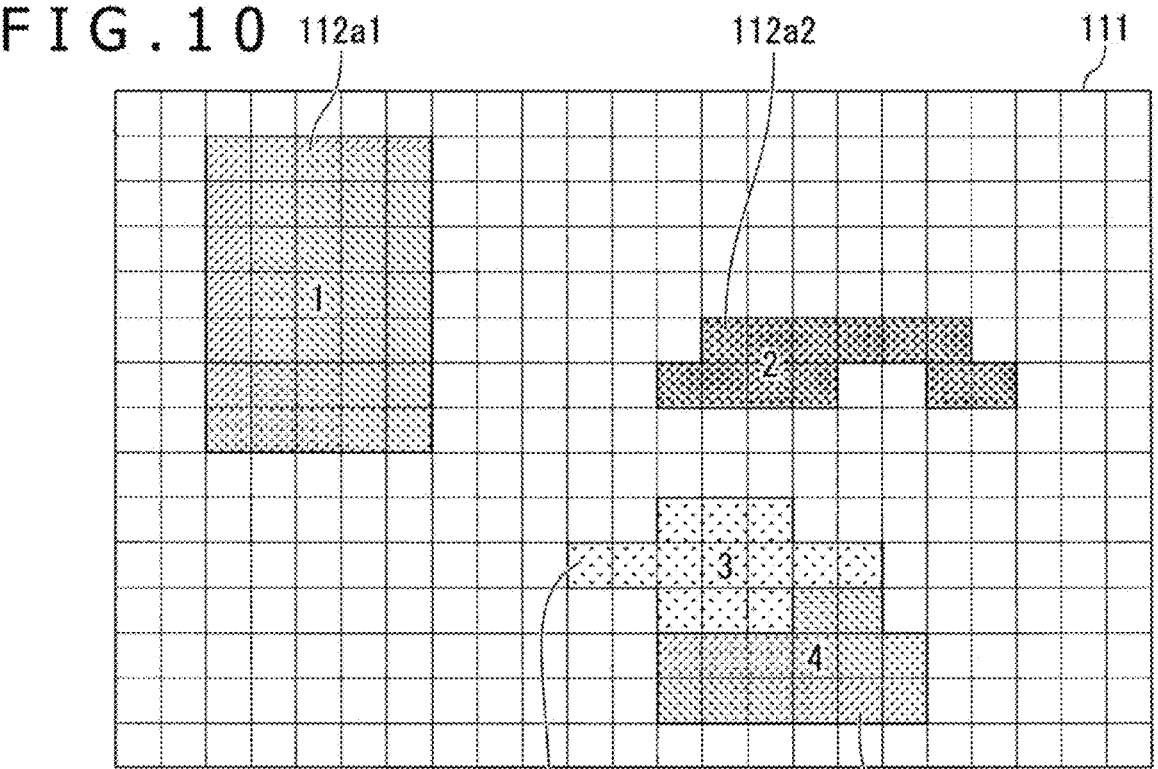
FIG. 10 is a diagram schematically illustrating regions where objects specified in a captured image are placed.
Figure 11:
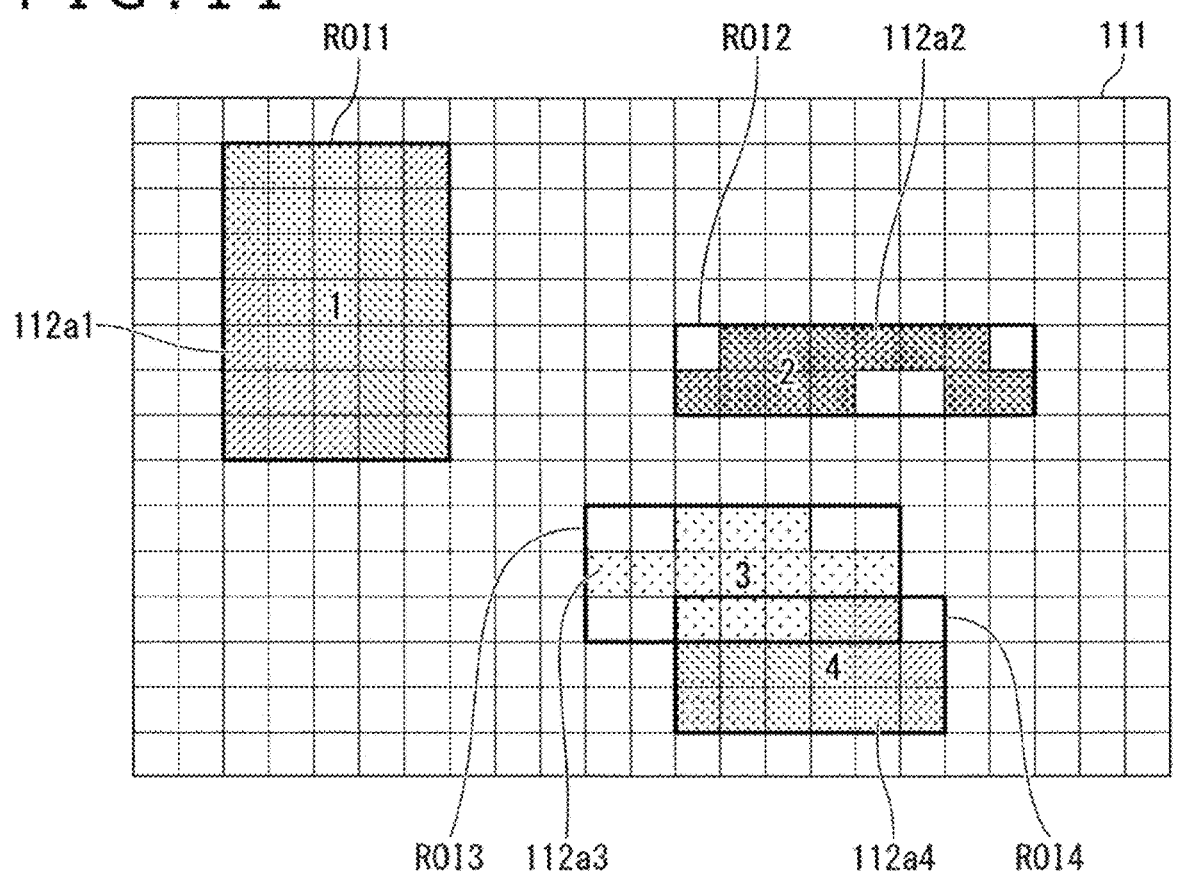
FIG. 11 is a diagram illustrating an example of ROIs established with respect to the specified objects.

A technology for transmitting a region of interest (ROI) as a partial region (non-rectangular in shape) segmented from a captured image will be described below using FIGS. 10 through 12 with reference to FIGS. 1 through 9. Specifically, a technology for transmitting and receiving an image of an object as an imaging target that is of a shape other than a square shape (rectangular shape) will be described below. FIG. 10 is a diagram schematically illustrating regions where objects specified in a captured image 111 are placed. For an easier understanding, FIG. 10 depicts the captured image 111 that is captured in an image capturing region including image capturing elements arranged in 15 rows×23 columns. FIG. 11 is a diagram illustrating an example of ROIs established with respect to the specified objects.

According to the presupposed technology 2, as with the presupposed technology 1, there will be described a situation where a predetermined process is performed on the captured image 111 input from the image capturing section 110 in a case where a control signal indicating the segmentation of ROIs is input from the video receiving apparatus 200 via the camera control interface CCI to the video transmitting apparatus 100. However, the presupposed technology 2 is also applicable to a situation where the video transmitting apparatus 100, i.e., the transmission side, indicates coordinates for segmenting ROIs. In such a case, the transmission side is configured to receive information representing "persons" or "objects" to be acquired by ROIs sent out from the reception side, and to make a decision and give an instruction as to segmenting coordinates, for example.

A control signal indicating the segmentation of ROIs is input from the video receiving apparatus 200 via the camera control interface CCI. In response to the control signal, as illustrated in FIG. 10, the ROI segmenting section 121 specifies four objects 1 through 4 included as imaging targets in the captured image 111. The object 1 has a rectangular shape taking up a portion of a left upper region of the captured image 111, for example. The object 2 has a shape taking up a partial region on the right side of the object 1 in the captured image 111 and devoid of both side corners of an upper side of a rectangular shape and a portion of a lower side thereof, for example. The object 3 has a shape taking up a partial region below the object 2 in the captured image 111 and devoid of four corners of a rectangular shape, for example. The object 4 has a shape taking up a partial region below the object 3 in the captured image 111 and devoid of both side corners of an upper side of a rectangular shape, for example. The object 3 and the object 4 partly overlap each other.

As illustrated in FIG. 11, the ROI segmenting section 121 (see FIG. 2) establishes minimum rectangular shapes including the specified objects as regions of interest ROI1 through ROI4, respectively. The ROI segmenting section 121 establishes the region of interest ROI1 for the object 1 and segments a ROI image 112a1. Furthermore, the ROI segmenting section 121 establishes the region of interest ROI2 for the object 2 and segments a ROI image 112a2. Furthermore, the ROI segmenting section 121 establishes the region of interest ROI3 for the object 3 and segments a ROI image 112a3. Furthermore, the ROI segmenting section 121 establishes the region of interest ROI4 for the object 4 and segments a ROI image 112a4.

The ROI segmenting section 121 stores the region of interest ROI1 and a region number "1" assigned to the region of interest ROI1 in the storage section in association with each other. The ROI segmenting section 121 stores the region of interest ROI2 and a region number "2" assigned to the region of interest ROI2 in the storage section in association with each other. The ROI segmenting section 121 stores the region of interest ROI3 and a region number "3" assigned to the region of interest ROI3 in the storage section in association with each other. The ROI segmenting section 121 stores the region of interest ROI4 and a region number "4" assigned to the region of interest ROI4 in the storage section in association with each other.

The ROI analyzing section 122 (see FIG. 2) derive positional information of the respective regions of interest ROI1 through ROI4. The ROI analyzing section 122 derives a physical region length XLa1 in the X-axis direction and a physical region length YLa1 in the Y-axis direction, for example, as the positional information of the region of interest ROI1. The ROI analyzing section 122 derives a physical region length XLa2 in the X-axis direction and a physical region length YLa2 in the Y-axis direction, for example, as the positional information of the region of interest ROI2. The ROI analyzing section 122 derives a physical region length XLa3 in the X-axis direction and a physical region length YLa3 in the Y-axis direction, for example, as the positional information of the region of interest ROI3. The ROI analyzing section 122 derives a physical region length XLa4 in the X-axis direction and a physical region length YLa4 in the Y-axis direction, for example, as the positional information of the region of interest ROI4. Furthermore, the ROI analyzing section 122 may derive, as positional information 113 of each region of interest ROI, an output region length XLc in the X-axis direction of the region of interest ROI and an output region length YLc in the Y-axis direction of the region of interest ROI, for example.

The ROI analyzing section 122 derives sizes and total amounts of data of the respective regions of interest ROI1 through ROI4 as information for a subsequent stage by deriving the lengths in the X-axis direction and the Y-axis directions of the respective regions of interest ROIs. The video receiving apparatus 200 that represents the subsequent stage can thus secure a memory space.

The ROI analyzing section 122 is configured to derive positional information of the ROI images 112a1 through 112a4, not the positional information of the regions of interest ROI, in a case where the objects as imaging targets and the regions of interest do not agree with each other in shape. The ROI analyzing section 122 derives left end coordinates (xn, yn) and physical region lengths XLn in the X-axis direction of the respective rows as the positional information of the ROI images 112a1 through 112a4. Furthermore, in a case where a ROI image is separated as in the second row of the ROI image 112a2, the ROI analyzing section 122 derives respective positional information of the separated portions. The ROI analyzing section 122 stores the region numbers of the regions of interest ROI1 through ROI4 and the positional information of the ROI images 112a1 through 112a4 in the storage section in association with each other.

Moreover, the ROI analyzing section 122 may derive sensing information, exposure information, gain information, AD word length, image format, etc., for example, other than the positional information, of the respective regions of interest ROI1 through ROI4, and store them in the storage section in association with the region numbers.

In a case where objects as imaging targets are of a rectangular shape, the overlap detecting section 123 (see FIG. 2) derives a region where ROI images overlap each other, not a region where regions of interest overlap each other, as a region of overlap. As illustrated in FIG. 11, the overlap detecting section 123 derives a region of overlap ROO as a region where the ROI image 112a3 and the ROI image 123a4 overlap each other. The overlap detecting section 123 stores the derived region of overlap ROO in the storage section in association with the respective positional information of the regions of interest ROI3 and ROI4.

The priority setting section 124 (see FIG. 2) assigns the priority "1" to the region of interest ROI1, and stores the priority "1" in the storage section in association with the region of interest ROI1. The priority setting section 124 assigns the priority "2" that is lower than the priority "1" to the region of interest ROI2, and stores the priority "2" in the storage section in association with the region of interest ROI2. The priority setting section 124 assigns the priority "3" that is lower than the priority "2" to the region of interest ROI3, and stores the priority "3" in the storage section in association with the region of interest ROI3. The priority setting section 124 assigns the priority "4" that is lower than the priority "3" to the region of interest ROI4, and stores the priority "4" in the storage section in association with the region of interest ROI4.

The encoding section 125 (see FIG. 2) generates respective transmission images of the ROI images 112a1 through 112a4. Since the priority of the region of interest ROI4 is lower than the priority of the region of interest ROI3, the encoding section 125 generates a transmission image by eliminating the region of overlap ROO from the ROI image 112a4.

The image processing controlling section 126 (see FIG. 2) generates ROI information and frame information and transmits them to the transmitting section 140 (see FIG. 2). The ROI information includes the respective positional information of the ROI images 112a1 through 112a4, for example. The ROI information also includes, other than the positional information, information (for example, the respective data types of the regions of interest ROI1 through ROI4, the number of the regions of interest ROI1 through ROI4 included in the captured image 111, the region numbers and priority of the regions of interest ROI1 through ROI4, etc.) similar to those in a case where objects as imaging targets are of a rectangular shape. The frame information includes, for example, information similar to those in a case where objects as imaging targets are of a rectangular shape, such as data types of the regions of interest ROI1 through ROI4.

The LINK controlling section 141 provided in the transmitting section 140 (see FIG. 2) outputs the frame information and the ROI information input from the image processing controlling section 126 per line to the ECC generating section 142 and the PH generating section 143 (see FIG. 2 for both). The ECC generating section 142 generates an error correcting code for a line in the frame information on the basis of data of the line (for example, the number of the virtual channel, the respective data types of the regions of interest ROI1 through ROI4, the payload length per line, etc.), for example. The ECC generating section 142 outputs the generated error correcting code to the PH generating section 143, for example. The PH generating section 143 generates a packet header PH (see FIG. 4) per line, using the frame information and the error correcting code generated by the ECC generating section 142.

The EBD buffer 144 (see FIG. 2) primarily stores the ROI information and outputs the ROI information at predetermined timing as embedded data to the combining section 147 (see FIG. 2).

The ROI data buffer 145 (see FIG. 2) primarily stores the compressed image data input from the encoding section 125 and outputs the compressed image data 120A as the payload data of a long packet to the combining section 147 in a case where a control signal indicating the segmentation of ROIs is input from the video receiving apparatus 200 via the camera control interface CCI.

In a case where a control signal indicating the segmentation of ROIs is input from the video receiving apparatus 200 via the camera control interface CCI, the combining section 147 generates transmission data 147A based on various input data (the packet header PH, the ROI information, and the compressed image data input from the encoding section 125 via the ROI data buffer 145. The combining section 147 outputs the generated transmission data 147A to the video receiving apparatus 200 via the data lane DL. Specifically, the combining section 147 includes the respective data types of the regions of interest ROI1 through ROI4 in the packet header PH of the payload data of a long packet and sends out the data. Furthermore, the combining section 147 sends out the respective image data (compressed image data) of the regions of interest ROI1 through ROI4 in a common virtual channel.

In a case where objects as imaging targets are not of a rectangular shape, the positional information of the ROI images 112a1 through 112a4 is included in the packet header PH or the payload data of a long packet. The positional information of the ROI images 112a1 through 112a4 is included in the packet header PH by the PH generating section 143. On the other hand, the positional information of the ROI images 112a1 through 112a4 is included in the payload data of a long packet by the combining section 147.

FIG. 12 is a diagram illustrating a configurational example of the transmission data 147A where the positional information of the ROI images 112a1 through 112a4 is included in the payload data of a long packet. As illustrated in FIG. 12, the transmission data 147A include a frame header area R1 and a packet area R2, for example. Incidentally, FIG. 12 illustrates details of the contents of the frame header area R1. Furthermore, low power modes LP are omitted from illustration in FIG. 12.

The frame header area R1 includes a frame number F1 as an identifier of the transmission data 147A, for example. The frame header area R1 includes information regarding compressed image data included in the packet area R2. The frame header area R1 includes, for example, the number of compressed image data (the number of ROIs) and information (ROI information) regarding each of the ROI images 112a1 through 112a4 corresponding to each compressed image data. The ROI information includes region numbers, physical region lengths, rectangular output region sizes, priority, exposure information, gain information, AD word lengths, and image formats. A physical region length represents the maximum length of a ROI image, and a rectangular output region size represents the size of a region of interest ROI.

"Info" illustrated in FIG. 12 represents region information stored in the payload of a long packet. The positional information of the ROI images 112a1 through 112a4 is stored in "info," for example. The positional information of the ROI images 112a1 through 112a4 is stored in the leading portions of the payloads of long packets. In a case where the physical region lengths in the X-axis direction of successive pixel rows making up ROI images are the same and each pixel row does not include a ROI image of a different region number, the region information "info" may not be stored in the payloads of long packets including image data of second and following ones of the pixel rows. According to the present example, in the ROI image 112a1, the physical region lengths in the X-axis direction of successive first through fourth ones of all the pixel rows are the same, and the first through fourth pixel rows do not include a ROI image of a different region number. Therefore, the region information "info" is not stored in the payloads of respective long packets including the image data of the second through fourth pixel rows that correspond to second and following ones of the successive first through fourth pixel rows making up the ROI image 112a1. According to the present example, furthermore, in the ROI image 112a4, the physical region lengths in the X-axis direction of successive second and third ones of all the pixel rows are the same, and the second and third pixel rows do not include a ROI image of a different region number. Therefore, the region information "info" is not stored in the payload of a long packet including the image data of the third pixel row that corresponds to second and following ones of the successive second and third pixel rows making up the ROI image 112a4. It is noted that, even in a case where the physical region lengths in the X-axis direction are the same and the respective pixel rows do not include a ROI image of a different region number, the region information "info" may be stored in the payload of each row.

The combining section 147 divides and places compressed image data generated by compressing the respective ROI images 112a1 through 112a4 per pixel row in the packet area R2 of the transmission data 147A, for example. "1" illustrated in FIG. 12 represents the compressed image data of the ROI image 112a1 stored in the payloads of long packets. "2" illustrated in FIG. 12 represents the compressed image data of the ROI image 112a2 stored in the payloads of long packets. "3" illustrated in FIG. 12 represents the compressed image data of the ROI image 112a3 stored in the payloads of long packets. "4" illustrated in FIG. 12 represents the compressed image data of the ROI image 112a4 stored in the payloads of long packets. In FIG. 12, the compressed image data are illustrated as being divided for an easy understanding. However, the data stored in the payloads of long packets are not divided. Compressed image data 112b corresponding to the image of the region of overlap ROO are not overlappingly included in the packet area R2 of the transmission data 147A. Furthermore, the combining section 147 has eliminated pixel rows that do not correspond to respective transmission images of the captured image 111 from the packet area R2 of the transmission data 147A. Consequently, pixel rows that do not correspond to respective transmission images of the captured image 111 are not included in the packet area R2 of the transmission data 147A.

Next, operation of the video receiving apparatus 200 in a case where it has received transmission data 147A will be described below.

The header separating section 211 of the receiving section 210 (see FIG. 8 for both) receives transmission data 147A from the video transmitting apparatus 100 via the data lane DL. Specifically, the header separating section 211 receives transmission data 147A including ROI information regarding the regions of interest ROI1 through ROI4 in the captured image 111 in the embedded data and also including image data (compressed image data) of the regions of interest ROI1 through ROI4 in the payload data of long packets. The header separating section 211 separates the received transmission data 147A into a frame header area R1 and a packet area R2.

The header interpreting section 212 (see FIG. 8) specifies the positions of the payload data of long packets included in the packet area R2 on the basis of data (specifically, embedded data) included in the frame header area R1.

The payload separating section 213 (see FIG. 8) separates the payload data of the long packets included in the packet area R2 from the packet area R2 on the basis of the positions of the payload data of the long packets that have been specified by the header interpreting section 212.

The EBD interpreting section 214 outputs the embedded data as EBD data to the information processing section 220 (see FIG. 8). Furthermore, the EBD interpreting section 214 discriminates whether the image data included in the payload data of the long packets are the compressed image data of the image data 116 of a ROI or the compressed image data of normal image data, from the data type included in the embedded data. The EBD interpreting section 214 outputs the discriminated result to the ROI data separating section 215 (see FIG. 8).

If image data where the image data included in the payload data of long packets represent a ROI are input, then the ROI data separating section 215 outputs the payload data of the long packets as payload data to the information processing section 220 (specifically, the ROI decoding section 222). The payload data of the long packets including ROI information include the ROI information and one line of pixel data of the compressed image data.

The information extracting section 221 (see FIG. 8) provided in the information processing section 220 extracts the number (four in the present example) of the regions of interest ROI1 through ROI4 included in the captured image 111, the region numbers 1 through 4 and the priorities 1 through 4 of the regions of interest ROI1 through ROI4, the data lengths of the respective regions of interest ROI1 through ROI4, and the image formats of the respective regions of interest ROI1 through ROI4 from the embedded data included in the EBD data input from the EBD interpreting section 214. Furthermore, the information extracting section 221 extracts the positional information of the ROI images 112a1 through 112a4 from the embedded data.

The ROI decoding section 222 decodes compressed image data 147B included in the payload data to extract the positional information of the ROI images 112a1 through 112a4 and generate image data (making up transmission images). In a case where payload data corresponding to a sixth pixel row, for example, are input, the ROI decoding section 222 extracts one piece of positional information of the ROI image 112a1 and two pieces of positional information of the ROI image 112a2 from the payload data, and generates respective image data (transmission images) of the ROI images 112a1 and 112b1 corresponding to the sixth pixel row.

In a case where payload data corresponding to a tenth pixel row, for example, are input, the ROI decoding section 222 extracts one piece of positional information of the ROI image 112a3 and one piece of positional information of the ROI image 112a4 from the payload data, and generates respective image data (transmission images) of the ROI images 112a3 and 112b4.

The ROI image generating section 223 (see FIG. 8) generates ROI images 112a1 through 112a4 of the regions of interest ROI1 through ROI4 in the captured image on the basis of the ROI information obtained by the information extracting section 221, the positional information of the ROI images 112a1 through 112a4 extracted by the ROI decoding section 222, and the transmission images generated by the ROI decoding section 222. In a case where the one piece of positional information of the ROI image 112a1 and two pieces of positional information of the ROI image 112a2, extracted from the payload data, corresponding to the sixth pixel row, for example, and their transmission images are input, the ROI image generating section 223 generates a ROI image 112a1 of five pixels extending in the X-axis direction, a ROI image 112a2 of four pixels extending in the X-axis direction at a position spaced five pixels from the ROI image 112a1, and a ROI image 112a2 of two pixels extending in the X-axis direction at a position spaced two pixels from the ROI image 112a2 (see FIG. 10).

Furthermore, the ROI image generating section 223 detects a region of overlap ROO where the region of interest ROI3 and the region of interest ROI4 overlap each other on the basis of the ROI information obtained by the information extracting section 221. The ROI image generating section 223 generates a ROI image 112a3 of four pixels extending in the X-axis direction and a ROI image 112a4 of three pixels extending in the X-axis direction with one pixel overlapping the ROI image 112a3 on the basis of the detected region of overlap ROO, the respective positional information of the ROI images 112a3 and 112a4, extracted from the payload, corresponding to the tenth pixel row, and the transmission images (see FIG. 10).

The ROI image generating section 223 outputs the generated images as ROI images to an apparatus at a subsequent stage (not illustrated).

In this manner, the video transmitting apparatus 100 and the video receiving apparatus 200 can send and receive images of objects as imaging targets as ROI images even if the objects are of a shape other than a rectangular shape.

3. A Transmitting Apparatus, a Receiving Apparatus, and a Transmission System According to a First Embodiment of the Present Disclosure Next, a transmitting apparatus, a receiving apparatus, and a transmission system according to a first embodiment of the present disclosure will be described below with reference to FIGS. 13 through 16. In describing the transmitting apparatus, the receiving apparatus, and the transmission system according to the present embodiment, the principles of an image quality adjusting process according to the present embodiment will first be described below with reference to FIG. 13. According to the present embodiment, an automatic exposure controlling process and an automatic white balance controlling process are carried out as the image quality adjusting process.

In a transmitting apparatus, a receiving apparatus, and a transmission system, generally, automatic exposure control is performed using the information of an image signal acquired by an image capturing section. For example, the transmitting apparatus that has the image capturing section has an information generating section (e.g., referred to as "automatic exposure detecting circuit") for acquiring a video signal being processed in a signal processing circuit of the image capturing section and generating information for automatic exposure. The information generating section calculates the brightness of a captured image based on the acquired information. On the basis of the calculated result from the information generating section, the image capturing section appropriately controls a shutter speed, an iris (lens aperture), and a gain to capture an image. The conventional transmitting apparatus, receiving apparatus, and transmission system have a problem in that they are unable to deal with brightness variations and light source variations on a screen as they are configured to control constant exposure on the screen in its entirety.

Accordingly, the transmitting apparatus, the receiving apparatus, and the transmission system according to the present embodiment are configured to determine the lens aperture, shutter speed, analog gain, and digital gain of an image capturing section for giving target brightness to an image captured by the image capturing section on the basis of the brightness of a region of interest, not the brightness on a screen in its entirety.

Furthermore, in a transmitting apparatus, a receiving apparatus, and a transmission system, generally, automatic white balance control is performed using the information of an image signal acquired by an image capturing section, as with the automatic exposure control. For example, the transmitting apparatus that has the image capturing section has an information generating section (e.g., referred to as "automatic white balance detecting circuit") for acquiring a video signal being processed in a signal processing circuit of the image capturing section and generating information for automatic white balance. The information generating section calculates the hues of a captured image based on the acquired information. On the basis of the calculated result from the information generating section, the image capturing section appropriately adjusts a white balance gain. The conventional transmitting apparatus, receiving apparatus, and transmission system have a problem in that they are unable to deal with hue variations on a screen as they are configured to control a constant white balance on the screen in its entirety.

Accordingly, the transmitting apparatus, the receiving apparatus, and the transmission system according to the present embodiment are configured to determine the white balance gain for giving target hues to an image captured by the image capturing section on the basis of the hues of a region of interest, not the hues on a screen in its entirety.

Figure 13:
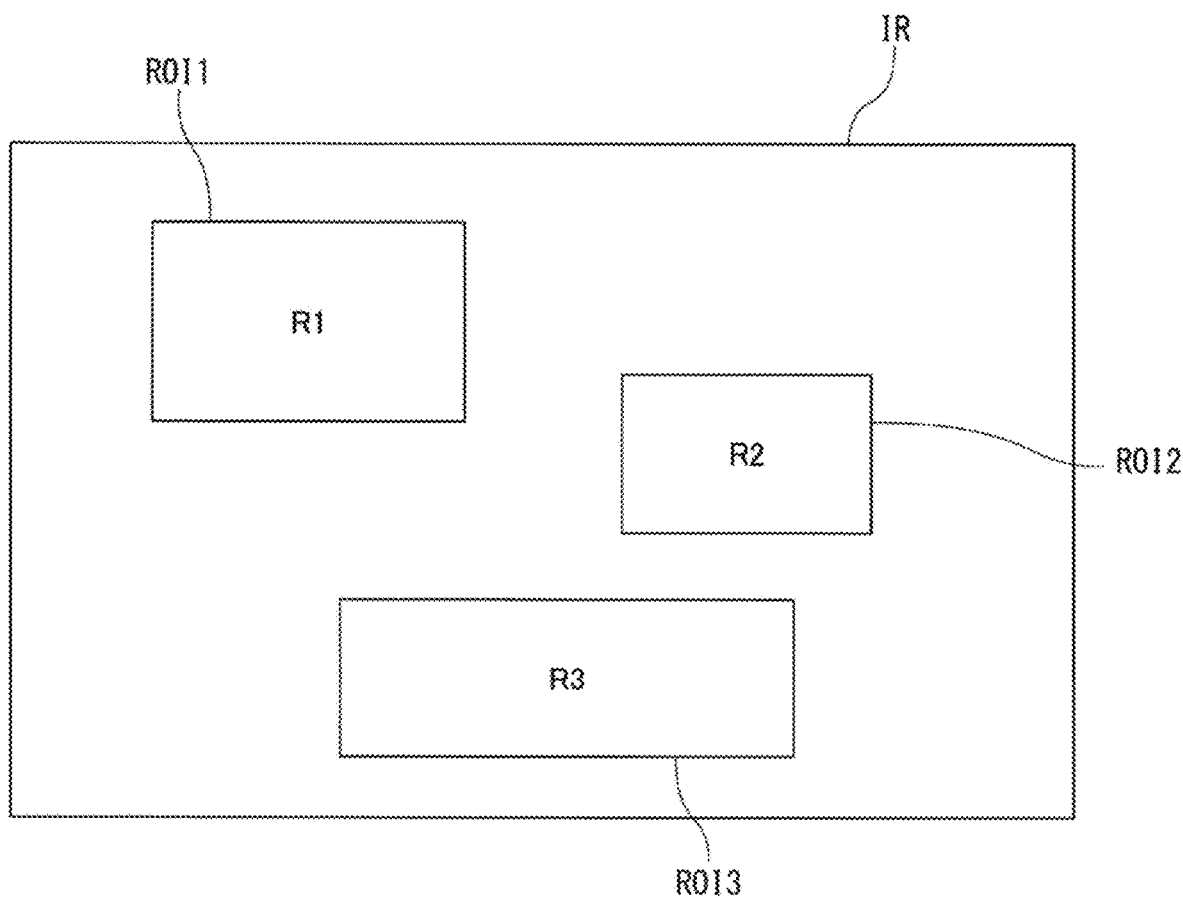
FIG. 13 is a diagram illustrating the principles of an image quality adjusting process according to an embodiment.

FIG. 13 is a diagram illustrating a process of calculating a gain in an automatic exposure controlling process and an automatic white balance controlling process as an image quality adjusting process according to the present embodiment. First, the process of calculating a gain in the automatic exposure controlling process will be described below.

As illustrated in FIG. 13, it is assumed that three regions of interest ROI1, ROI2, and ROI3 are established in an image capturing region IR. In this case, first, the sizes of the regions of interest ROI1 through ROI3 are calculated using the lengths in the X-axis directions and the Y-axis directions that are included in the positional information of the regions of interest ROI1 through ROI3. The largest region of interest is determined as a reference region of interest. In the example illustrated in FIG. 13, the region of interest ROI3 is determined as a reference region of interest.

Next, exposure conditions for controlling the exposure of the image capturing section are determined from a detected value of the reference region of interest (reference detected value). The reference detected value is represented by an average value of luminance of all the pixels that make up the reference region of interest, for example. Moreover, the numerical values of a shutter speed, a lens aperture, an analog gain, and a digital gain are determined as the exposure conditions. In determining the exposure conditions, in order that the analog gain will not become a negative gain, gains are established not to apply all the gains with the analog gain. In the example illustrated in FIG. 13, since the region of interest ROI3 is determined as a reference region of interest, the average value of luminance of all the pixels that make up the reference region of interest ROI3 is determined as a reference detected value.

Next, detected values of the other regions of interest than the reference region of interest are determined. In the example illustrated in FIG. 13, the average value of luminance of all the pixels that make up the reference region of interest ROI1 is determined as a detected value of the region of interest ROI1. Likewise, the average value of luminance of all the pixels that make up the reference region of interest ROI2 is determined as a detected value of the region of interest ROI2.

Next, digital gains of a plurality of regions of interest are independently calculated on the basis of the ratios between the reference detected value of the reference region of interest, among the plurality of regions of interest, and the detected values of the remaining regions of interest. Providing a digital gain at the present time of the reference region of interest is represented by "DG_ref," a reference detected value by "L_ref," an established value of the digital gain of the region of interest determined as the reference region of interest by "DG_RR," an established value of the digital gain of a region of interest other than the reference region of interest by "DG_Rn" (n represents the region number of the region of interest), and a reference value of the region of interest by "L_Rn," the established values of the digital gains of the regions of interest are expressed by the following equations (1) and (2):

$$DG\_RR = DG\_ref \times (L\_ref/L\_ref) \quad (1)$$

$$DG\_Rn = DG\_ref \times (L\_ref/L\_Rn) \quad (2)$$

It is assumed that the region number of the region of interest ROI1 illustrated in FIG. 13 is represented by "1," the region number of the region of interest ROI2 by "2," and the region number of the region of interest ROI3 by "3." Moreover, it is assumed that the detected value of the region of interest ROI1 is represented by L_R1, the detected value of the region of interest ROI2 by L_R2, and the detected value of the region of interest ROI31 by L_R3. In FIG. 13, since the region of interest ROI3 is determined as the reference region of interest, the reference value L_R3 of the region of interest ROI3 becomes the reference detected value L_ref, and the digital gain at the present time of the region of interest ROI3 becomes the digital gain DG_ref at the present time of the reference region of interest. Therefore, the established values of the digital gains of the regions of interest RO1 through ROI3 are expressed by the following equations (3) through (5):

$$DG\_R1 = DG\_ref \times (L\_ref/L\_R1) \quad (3)$$

$$DG\_R2 = DG\_ref \times (L\_ref/L\_R2) \quad (4)$$

$$DG\_RR = DG\_ref \times (L\_ref/L\_ref) \quad (5)$$

The established value DG_RR of the digital gain of the reference region of interest is the established value DG_R3 of the digital gain of the region of interest ROI3. Consequently, the established value DG_R3 of the digital gain of the region of interest ROI3 is expressed by the following equation (6) because of the equation (5):

$$DG\_R3 = DG\_ref \quad (6)$$

In the equations (1) and (2), the digital gains of the regions of interest other than the reference region of interest are corrected on the basis of the ratios between the reference detected value of the reference region of interest and the detected values of the regions of interest other than the reference region of interest. However, the digital gains of the regions of interest other than the reference region of interest may be corrected on the basis of the distances between the reference region of interest and the regions of interest other than the reference region of interest and the center of the image capturing region IR. Moreover, the digital gains of the regions of interest other than the reference region of interest may be corrected on the basis of the differences between the reference detected value of the reference region of interest and the detected values of the regions of interest other than the reference region of interest. In addition, in a case where the differences or ratios between the reference detected value of the reference region of interest and the detected values of the regions of interest other than the reference region of interest do not exceed a predetermined threshold value, the digital gains of the regions of interest other than the reference region of interest may not be corrected.

Next, the process of calculating a gain in the automatic white balance controlling process will be described below. In the automatic white balance controlling process, first, a reference region of interest is determined among a plurality of regions of interest. A process of determining a reference region of interest in the automatic white balance controlling process is the same as the process of determining a reference region of interest in the automatic exposure controlling process, and hence will be omitted from description.

Next, a white balance gain WB_g is calculated with respect to each of the regions of interest. The white balance gain WB_g is calculated using a detected value of each of the regions of interest. The detected value is represented by an average value of luminance of the color pixels that make up the reference region of interest, for example. It is assumed that a region of interest has red pixels, green pixels, and blue pixels (an example of a plurality of color pixels) arrayed according to predetermined rules. In this case, a detected value of each region of interest is calculated as three average values, i.e., an average value of luminance of the red pixels (hereinafter referred to as "R pixels"), an average value of luminance of the green pixels (hereinafter referred to as "G pixels"), and an average value of luminance of the blue pixels (hereinafter referred to as "B pixels").

The white balance gain WB_g is used to correct the luminance of the R pixels, the luminance of the G pixels, and the luminance of the B pixels such that the luminance of the R pixels, the luminance of the G pixels, and the luminance of the B pixels will be equal to each other in each region of interest. According to the present embodiment, the white balance gain WB_g is calculated to correct the luminance of the R pixels and the luminance of the B pixels in order to bring the luminance of the R pixels and the luminance of the B pixels into conformity with the luminance of the G pixels that are of the highest visual sensitivity among the three colors. It is assumed that a detected value based on the luminance of the R pixels of the reference region of interest is represented by "DT_ref_R," a detected value based on the luminance of the G pixels of the reference region of interest by "DT_ref_G," and a detected value based on the luminance of the B pixels of the reference region of interest is represented by "DT_ref_B." It is also assumed that a detected value based on the luminances of the R pixels of another region of interest than the reference region of interest is represented by "DT_Rn" (n represents the region number of the region of interest), a detected value based on the luminances of the G pixels of the region of interest by "DT_G" (n represents the region number of the region of interest), and a detected value based on the luminances of the B pixels of the region of interest by "DT B" (n represents the region number of the region of interest). Then, a white balance gain WB_gref_R for the R pixels of the reference region of interest, a white balance gain WB_gref_G for the G pixels thereof, and a white balance gain WB_gref_B for the B pixels thereof are expressed by the following equations (7) through (9):

$$WB\_gref\_R = DT\_ref\_G/DT\_ref\_R \quad (7)$$

$$WB\_gref\_G = DT\_ref\_G/DT\_ref\_G \quad (8)$$

$$WB\_gref\_B = DT\_ref\_G/DT\_ref\_B \quad (9)$$

In addition, a white balance gain WB_g_Rn for the R pixels of the other region of interest than the reference region of interest, a white balance gain WB_g_Gn for the G pixels thereof, and a white balance gain WB_Bn for the B pixels thereof are expressed by the following equations (10) through (12):

$$WB\_g\_Rn = DT\_Gn/Dt\_Rn \qquad (10)$$

$$WB\_g\_Gn = DT\_Gn/Dt\_Gn \qquad (11)$$

$$WB\_g\_Bn = DT\_Gn/Dt\_Bn \qquad (12)$$

Next, using the white balance gains WB_gref_R, WB_gref_G, and WB_gref_B for the color pixels of the reference region of interest, and the white balance gains WB_g_Rn, WB_g_Gn, and WB_g_Bn for the color pixels of the other region of interest than the reference region of interest, a white balance gain to be finally established by alpha blending (hereinafter referred to as "final white balance gain"), for example, is determined. The final white balance gain is determined per color pixel. It is herein assumed that a final white balance gain for the R pixels of the reference region of interest is represented by "LWB_g_RR," a final white balance gain for the G pixels of the reference region of interest is represented by "LWB_g_GR," and final white balance gain for the B pixels of the reference region of interest is represented by "LWB_g_BR." Furthermore, it is also assumed that a coefficient for alpha blending is represented by "a," a final white balance gain for the R pixels of the other region of interest than the reference region of interest by "LWB_g_Rn" (n represents the region number of the region of interest), a final white balance gain for the G pixels of the other region of interest than the reference region of interest by "LWB_g_Gn" (n represents the region number of the region of interest), and a final white balance gain for the B pixels of the other region of interest than the reference region of interest by "LWB_g_Bn" (n represents the region number of the region of interest). Then, final white balance gains for the respective color pixels are expressed by the following equations (13) through (15):

$$LWB\_g\_Rn = WB\_gref\_R \times \alpha + WB\_g\_Rn \times (1-\alpha) \qquad (13)$$

$$LWB\_g\_Gn = WB\_gref\_G \times \alpha + WB\_g\_Gn \times (1-\alpha) \qquad (14)$$

$$LWB\_g\_Bn = WB\_gref\_B \times \alpha + WB\_g\_Bn \times (1-\alpha) \qquad (15)$$

It is assumed that the region number of the region of interest ROI1 illustrated in FIG. 13 is represented by "1," the region number of the region of interest ROI2 illustrated in FIG. 13 is represented by "2," and the region number of the region of interest ROI3 illustrated in FIG. 13 is represented by "3." Therefore, final white gains for the region of interest ROI1 are expressed by the following equations (16) through (18):

$$LWB\_g\_R1 = WB\_gref\_R \times \alpha + WB\_g\_R1 \times (1-\alpha) \qquad (16)$$

$$LWB\_g\_G1 = WB\_gref\_G \times \alpha + WB\_g\_G1 \times (1-\alpha) \qquad (17)$$

$$LWB\_g\_B1 = WB\_gref\_B \times \alpha + WB\_g\_B1 \times (1-\alpha) \qquad (18)$$

Moreover, final white gains for the region of interest ROI2 are expressed by the following equations (19) through (21):

$$LWB\_g\_R2 = WB\_gref\_R \times \alpha + WB\_g\_R2 \times (1-\alpha) \qquad (19)$$

$$LWB\_g\_G2 = WB\_gref\_G \times \alpha + WB\_g\_G2 \times (1-\alpha) \qquad (20)$$

$$LWB\_g\_B2 = WB\_gref\_B \times \alpha + WB\_g\_B2 \times (1-\alpha) \qquad (21)$$

Furthermore, final white gains for the region of interest ROI3 are expressed by the following equations (22) through (24):

$$LWB\_g\_R3 = WB\_gref\_R \times \alpha + WB\_g\_R3 \times (1-\alpha) \qquad (22)$$

$$LWB\_g\_G3 = WB\_gref\_G \times \alpha + WB\_g\_G3 \times (1-\alpha) \qquad (23)$$

$$LWB\_g\_B3 = WB\_gref\_B \times \alpha + WB\_g\_B3 \times (1-\alpha) \qquad (24)$$

According to the present embodiment, as described above, white balance gains are calculated in order to bring the luminance of the R pixels and the luminance of the B pixels into conformity with the luminance of the G pixels. Consequently, the white balance gains WB_gref_G and WB_g_Gn for the G pixels are "1" (see the equations (8) and (11)). Therefore, the final white balance gain LWB_g_Gn for the G pixels is "1" (see the equations (14), (17), (20), and (23)).

Moreover, since the region of interest ROI3 is the reference region of interest, the white balance gain WB_g_B3 for the region of interest ROI3 and the white balance gain WB_gref_B for the reference region of interest are equal to each other. Therefore, the final white balance gains LWB_g_R3, LWB_g_G3, and LWB_g_B3 for the region of interest ROI3 are expressed by the following equations (25) through (27):

$$LWB\_g\_R3 = WB\_gref\_R \qquad (25)$$

$$LWB\_g\_G3 = WB\_gref\_G \qquad (26)$$

$$LWB\_g\_B3 = WB\_gref\_B \qquad (27)$$

The coefficient α may adaptively be changed from the distance information from the center of the image capturing region to the region of interest, the difference between the detected value of the reference region of interest and the detected value of the other region of interest than the reference region of interest, the difference between color temperatures determined from the difference between the detected values, the reliability of light source prediction, or the like. Moreover, in a case where the size (area) of a region of interest is equal to or smaller than a predetermined threshold value, the white balance of the region of interest may not be processed independently, and the final white balance gain therefor may be set to the same value as the reference region of interest, for example.

The set value of the digital gain and the set value of the final white balance gain for each region of interest can be calculated by either one of the transmitting apparatus and the receiving apparatus according to the present embodiment.

Figure 14:
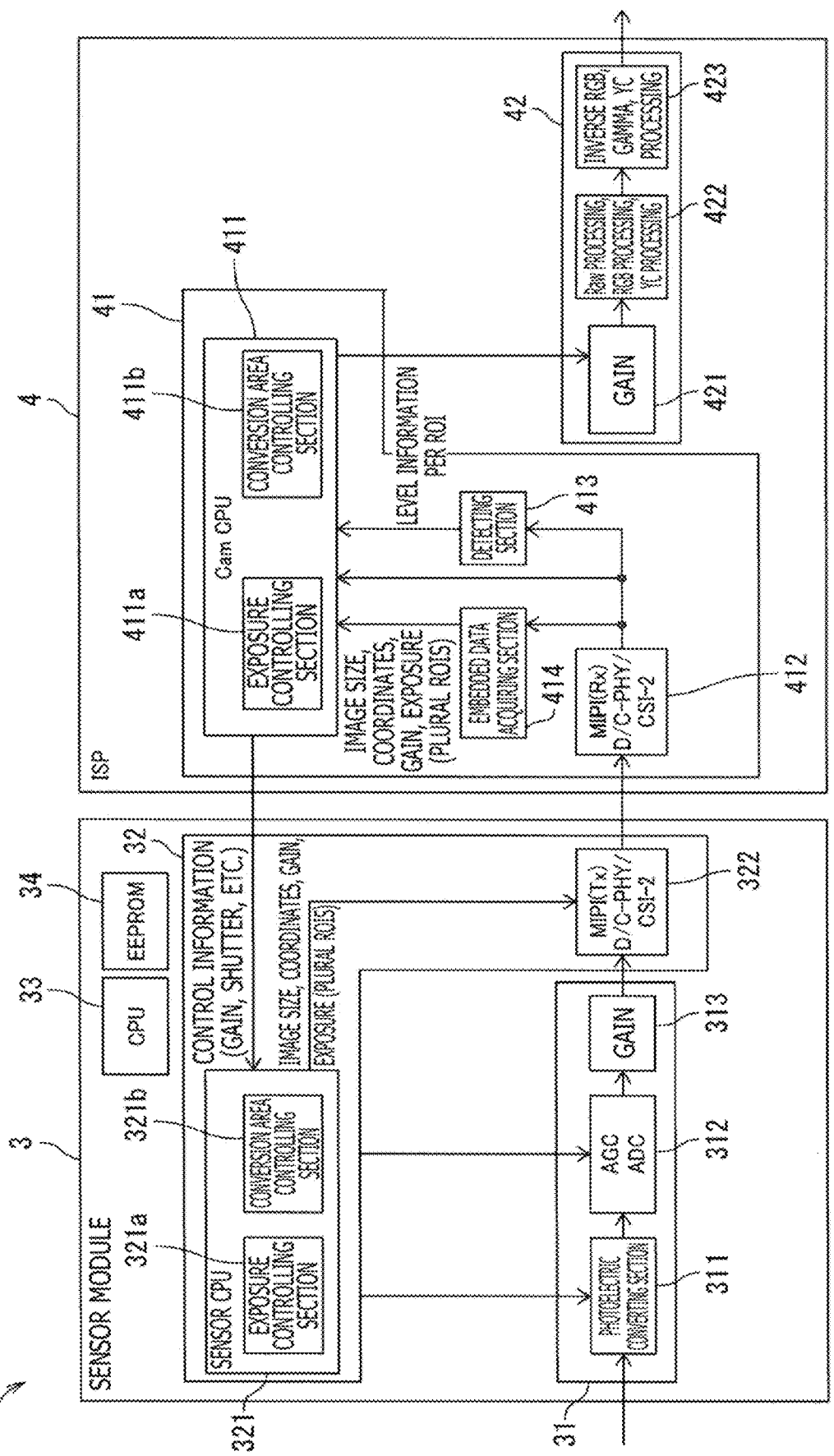
FIG. 14 is a block diagram illustrating a general makeup of a transmitting apparatus, a receiving apparatus, and a transmission system according to the embodiment.

Next, a transmitting apparatus, a receiving apparatus, and a transmission system according to the present embodiment will be described below with reference to FIG. 14. FIG. 14 is a block diagram illustrating a general makeup of a video transmitting apparatus 3, a video receiving apparatus 4, and a transmission system 10 according to the present embodiment.

As illustrated in FIG. 14, the video transmission system (an example of the transmission system) 10 according to the present embodiment includes the video transmitting apparatus (an example of the transmitting apparatus) 3 that functions as an image sensor and the video receiving apparatus (an example of the receiving apparatus) 4 that functions as an image signal processor (ISP). In the video transmission system 10, the video transmitting apparatus 3 is configured to have a transmitting section 322 send out signals according to the MIPI (Mobile Industry Processor Interface) D-PHY standard, the MIPI C-PHY standards, or the MIPI CSI (Camera Serial Interface)-2 standards. In the video transmission system 10, furthermore, the video receiving apparatus 4 is configured to have a receiving section 412 receive signals according to the MIPI D-PHY standards, the MIPI C-PHY standards, or the MIPI CSI-2 standards. Moreover, the video transmission system 10 is a system capable of sending and receiving signals according to various standards and may be configured to send and receive signals according to the MPIP CSI-3 standards, the MIPI DSI standards, or other standards between the video transmitting apparatus 3 and the video receiving apparatus 4, as with the video transmission system 1 according to the presupposed technologies 1 and 2.

The video transmitting apparatus 3 provided in the video transmission system 10 is configured to perform functions equivalent to those of the video transmitting apparatus 100 according to the presupposed technologies 1 and 2. Specifically, the video transmitting apparatus 3 is configured to perform the similar process to the video transmitting apparatus 100 on captured images input from an image capturing section 31 in a case where a control signal indicating the segmentation of ROIs is input from the video receiving apparatus 4. Furthermore, the video transmitting apparatus 3 is configured to perform the similar process to the video transmitting apparatus 100 on captured images input from the image capturing section 31 in a case where a control signal indicating the outputting of a normal image is input from the video receiving apparatus 4. Moreover, the video transmitting apparatus 3 is configured to acquire demosaicing information for use in the above demosaicing process and send out the demosaicing information to the video receiving apparatus 4. Furthermore, the video transmitting apparatus 3 is applicable where it (i.e., the video transmitting apparatus 3) determines coordinates for segmenting a ROI even in a case where a control signal indicating the segmentation of ROIs is not input from the video receiving apparatus 4. In this case, the video transmitting apparatus 3 receives information of a "person," an "object," or the like to be acquired as a ROI sent from the video receiving apparatus 4 side and decides on and determines segmenting coordinates.

The video receiving apparatus 4 is configured to perform functions equivalent to those of the video receiving apparatus 200 according to the presupposed technologies 1 and 2. Specifically, the video receiving apparatus 4 is configured to perform the similar process to the video receiving apparatus 200 according to the presupposed technologies 1 and 2 on transmission data transmitted from the video transmitting apparatus 3. Furthermore, the video receiving apparatus 4 is configured to perform an image quality adjusting process using image quality adjusting information transmitted from the video transmitting apparatus 3.

Accordingly, FIG. 14 centers in its illustration around those components of the video transmitting apparatus 3 and the video receiving apparatus 4 that are relevant to the image quality adjusting process. The video transmitting apparatus 3 and the video receiving apparatus 4 according to the present embodiment are configured to perform an automatic exposure process and a white balance controlling process as the image quality adjusting process.

As illustrated in FIG. 14, the video transmitting apparatus 3 includes the image capturing section 31 that captures images of targets. The image capturing section 31 has a photoelectric converting section 311 for converting incident light into electric signals, for example. The photoelectric converting section 311 includes, for example, a CCD image sensor or a CMOS image sensor. Furthermore, the image capturing section 31 has a signal converting section 312 for converting an analog electric signal input from the photoelectric converting section 311 into digital image data. The signal converting section 312 is configured to perform a signal amplifying (AGC) process for amplifying the analog electric signal input from the photoelectric converting section 311 and an analog-to-digital converting (ADC) process for converting the amplified signal into a digital signal. The image capturing section 31 has an amplifying section 313 for applying a digital gain to image data input from the signal converting section 312. The amplifying section 313 outputs the image data with the digital gain applied thereto to the transmitting section 322. The digital gain that the amplifying section 313 applies to the image data is a digital gain for the reference region of interest described above. The electric signal obtained by the photoelectric converting section 311 may be processed by an analog gain (to be described later) determined on the basis of the luminance of the reference region of interest described above.

The video transmitting apparatus 3 includes a controlling section 32 for controlling the image capturing section 31 and controlling predetermined signal processing processes. The controlling section 32 has a sensor CPU 321 and the transmitting section 322. The sensor CPU 321 is configured to perform the similar functions to the image processing sections 120 and 130 (see FIG. 2). The transmitting section 322 is configured to perform the similar functions to the transmitting section 140 (see FIG. 2). In the controlling section 32, the sensor CPU 321 may be replaced with image processing sections 120 and 130 and the transmitting section 322 may be replaced with the transmitting section 140.

The sensor CPU 321 has an exposure controlling section 321a for controlling exposure conditions of the photoelectric converting section 311. Furthermore, the sensor CPU 321 has a conversion area controlling section (an example of a controlling section) 321b for controlling the acquisition of image quality adjusting information including information for use in adjusting the image quality of each of a plurality of ROIs. Each of the sensor CPU 321 having the conversion area controlling section 321b and the controlling section 32 corresponds to an example of a controlling section for controlling the acquisition of image quality adjusting information including information for use in adjusting the image quality of each of a plurality of ROIs.

As illustrated in FIG. 14, the sensor CPU 321 is configured to be supplied with control information (to be described in detail later) input from the video receiving apparatus 4. The control information includes information regarding a shutter speed, an iris (lens aperture), and a gain for controlling the image capturing section 31. The exposure controlling section 321a is configured to control the shutter speed and the iris (lens aperture) of the image capturing section 31 on the basis of the control information and also to apply an analog gain to an electric signal output from the photoelectric converting section 311. As described in detail later, the control information represents information extracted and generated from image quality adjusting information, acquired by the sensor CPU 321, of a reference region of interest (an example of one ROI) selected from a plurality of regions of interest. Therefore, the exposure controlling section 321*a* corresponds to an example of a controlling section for controlling the acquisition of exposure control information for controlling exposure (control information input from the video receiving apparatus 4) from image quality adjusting information of a reference region of interest (an example of one ROI) selected from a plurality of regions of interest.

The conversion area controlling section 321*b* is configured to acquire image quality adjusting information of a region of interest ROI. In a case where a plurality of regions of interest ROI is established, the conversion area controlling section 321*b* is configured to acquire image quality adjusting information of each of the regions of interest ROI. The conversion area controlling section 321*b* is configured to acquire information of the luminance of each of the regions of interest ROI as the image quality adjusting information. The conversion area controlling section 321*b* acquires luminance information of all the pixels making up the regions of interest ROI as the image quality adjusting information per region of interest ROI.

Incidentally, the image capturing region provided in the photoelectric converting section 311 has a plurality of color pixels arrayed according to predetermined rules. According to the present embodiment, the image capturing region has R pixels, G pixels, and B pixels as color pixels. A region of interest ROI is a partial region extracted from the image capturing region. Therefore, the region of interest ROI has a plurality of color pixels arrayed according to predetermined rules. The conversion area controlling section 321*b* acquires white balance control information based on information of the luminance of each of the color pixels (R pixels, G pixels, and B pixels according to the present embodiment) as image quality adjusting information.

The conversion area controlling section 321*b* is configured to acquire positional information (e.g., the coordinates of a left upper end pixel and the length in the X-axis directions and the length in the Y-axis directions) of each of the regions of interest ROI as image quality adjusting information. The conversion area controlling section 321*b* outputs the positional information of the regions of interest ROI, the luminance information of the pixels that make up the regions of interest ROI, and the luminance information of the color pixels that make up the regions of interest ROI, which have been acquired as image quality adjusting information, in association with the region numbers of the regions of interest ROI, to the transmitting section 322. Moreover, the conversion area controlling section 321*b* acquires and outputs the value of a digital gain and exposure information of regions of interest that have been established at the present time to the transmitting section 322.

The transmitting section 322 generates transmission data (see FIGS. 6 and 12) including the image quality adjusting information per region of interest ROI input from the sensor CPU 321, the value of the digital gain and the exposure information of the reference region of interest established at the present time, the image data input from the image capturing section 31, etc., and sends out the transmission data to the video receiving apparatus 4. The image quality adjusting information is included in the ROI information and sent out from the transmitting section 322. Since the ROI information is included in the embedded data, the image quality adjusting information is included in the embedded data and sent out from the transmitting section 322.

As illustrated in FIG. 19, the video transmitting apparatus 3 includes the transmitting section 322 that sends out image data of regions of interest ROI as the payload data and information regarding the regions of interest ROI as embedded data. The transmitting section 322 includes demosaicing information as one piece of information regarding the regions of interest ROI in the embedded data and sends out the demosaicing information to the video receiving apparatus 4. The transmitting section 322 is configured to send out transmission data including the demosaicing information, etc. according to the MIPI D-PHY standards, the MIPI C-PHY standards, or the MIPI CSI-2 standards, for example.

The video transmitting apparatus 3 includes a controlling section 33 and a nonvolatile storage section 34. In a case where the video transmitting apparatus 3 determines a target to be imaged, the controlling section 33 controls the detection of the target to be imaged, image recognition, etc. The nonvolatile storage section 34 stores initial adjustment data for the video transmitting apparatus 3 and the video receiving apparatus 4. The nonvolatile storage section 34 includes an EEPROM, for example.

As illustrated in FIG. 14, the video receiving apparatus 4 includes a controlling section 41 for controlling a predetermined signal processing process using transmission data transmitted from the video transmitting apparatus 3. The controlling section 41 has a Cam CPU 411, a receiving section 412, a detecting section 413, and an embedded data acquiring section 414. The Cam CPU 411 is configured to perform the similar functions to the information processing section 220 (see FIG. 8), except for the information extracting section 221 (see FIG. 8). The receiving section 412 is configured to perform the similar functions to the receiving section 210 (see FIG. 8), except for the EBD interpreting section 214 (see FIG. 8). In the video receiving apparatus 4, the embedded data acquiring section 414 is configured to perform the similar functions to the EBD interpreting section 214 and the information extracting section 221. In the controlling section 41, the receiving section 412 and the embedded data acquiring section 414 may be replaced with the receiving section 210, and the Cam CPU 411 and the detecting section 413 may be replaced with the information processing section 220. In this case, the functions of the information extracting section 221 that are performed by the embedded data acquiring section 414 are performed by the receiving section 220.

As illustrated in FIG. 14, the video receiving apparatus 4 includes the receiving section 412 that receives a transmission signal where image data of regions of interest ROI in images are included in the payload data and information regarding the regions of interest ROI is included in the embedded data. The receiving section 412 is configured to receive transmission data input from the video transmitting apparatus 3. The receiving section 412 receives the transmission data according to the MIPI D-PHY standards, the MIPI C-PHY standards, or the MIPI CSI-2 standards. The receiving section 412 is configured to generate various data from the input transmission data and outputs the generated data to the Cam CPU 411, the detecting section 413, and the embedded data acquiring section 414. As illustrated in FIG. 14, the controlling section 41 included in the video receiving apparatus 4 is configured to control the extraction of image quality adjusting information including information for adjusting the image quality of a plurality of regions of interest ROI from a transmission signal (transmission data) received by the receiving section 412. The controlling section 41 is configured such that the extraction of the image quality adjusting information is performed by the Cam CPU 411, the detecting section 413, and the embedded data acquiring section 414.

The detecting section 413 is configured to extract information of the luminance of each of a plurality of regions of interest ROI as image quality adjusting information. The detecting section 413 is configured to calculate a reference detected value and a detected value (both represent an example of a control value) for controlling a digital gain (an example of an amplification degree) of image data of the regions of interest ROI on the basis of the ratio between information of the luminance of a reference region of interest (an example of one ROI) selected from the regions of interest ROI and information of the luminance of the remainder of the regions of interest ROI. The detecting section 413 extracts positional information and luminance information of all the regions of interest ROI that are included in the ROI information included in the transmission data, and calculates, as a reference detected value, an average value of luminance of the pixels that make up the region of interest ROI whose region number agrees with the region number of the reference region of interest input from the Cam CPU 411. Moreover, with respect to the remaining regions of interest ROI, the detecting section 413 calculates an average value of luminance of the pixels that make up each of the regions of interest ROI as a detected value, in the similar manner to with the reference region of interest. The detecting section 413 outputs the calculated reference detected value and the calculated detected value in association with the region numbers of the regions of interest ROI to the Cam CPU 411.

The detecting section 413 calculates detected values DT_ref_R, DT_ref_G, and DT_ref_B on the basis of the luminance of the color pixels that make up the reference region of interest for use in calculating white balance gains. Moreover, the detecting section 413 calculates detected values DT_Rn, DT_Gn, and DT_Bn on the basis of the luminance of the color pixels that make up the other regions of interest ROI than the reference region of interest for use in calculating white balance gains. The detecting section 413 calculates detected values DT_Rn, DT_Gn, and DT_Bn per region of interest ROI. The detecting section 413 outputs the calculated detected values DT_ref_R, DT_ref_G, and DT_ref_B and the calculated detected values DT_Rn, DT_Gn, and DT_Bn in association with the region numbers of the regions of interest ROI to the Cam CPU 411.

The embedded data acquiring section 414 is configured to extract image quality adjusting information from ROI information included in a transmission signal (transmission data) input from the receiving section 412. The ROI information is included in embedded data. Therefore, the embedded data acquiring section 414 is configured to extract image quality adjusting information from the embedded data. The embedded data acquiring section 414 acquires, as image quality adjusting information, positional information (e.g., the coordinates of a left upper end and the length in the X-axis directions and the length in the Y-axis directions), gain information, and exposure information of the regions of interest ROI sent out from the video transmitting apparatus 3. The embedded data acquiring section 414 is configured to output the acquired information to the Cam CPU 411.

The embedded data acquiring section 414 acquires, other than the image quality adjusting information, various pieces of information (for example, the number of regions of interest ROI, the region numbers and priority of the regions of interest ROI, the data lengths of the regions of interest ROI, the image format of the regions of interest ROI, etc.) included in the embedded data. The embedded data acquiring section 414 outputs the acquired various pieces of information to the Cam CPU 411.

As illustrated in FIG. 14, the Cam CPU 411 has an exposure controlling section 411a. The exposure controlling section (an example of the controlling section) 411a is configured to acquire exposure control information for controlling exposure from image quality adjusting information of a reference region of interest (an example of one ROI) selected from a plurality of regions of interest ROI. Specifically, the exposure controlling section 411a is configured to generate control information (an example of the exposure control information, e.g., a shutter speed, an iris (lens aperture), and a gain) for controlling the image capturing section 31 provided in the video transmitting apparatus 3 on the basis of the image quality adjusting information input from the detecting section 413 and the embedded data acquiring section 414. For example, the exposure controlling section 411a is configured to extract control information for controlling exposure from image quality adjusting information of a reference region of interest selected from a plurality of regions of interest ROI. More specifically, the exposure controlling section 411a determines control information for controlling the image capturing section 31 from the reference detected value of the reference region of interest. The Cam CPU 411 sends out the control information generated by the exposure controlling section 411a to the sensor CPU 321 provided in the video transmitting apparatus 3.

As illustrated in FIG. 14, the Cam CPU 411 has a conversion area controlling section 411b. The conversion area controlling section 411b extracts positional information and luminance information of all the regions of interest ROI included in the ROI information included in the transmission data. The Cam CPU 411 determines a region of interest ROI whose size (image size) is largest as a reference region of interest, and outputs the region number of the region of interest ROI determined as the reference region of interest to the detecting section 413.

The conversion area controlling section 411b is configured to calculate digital gains DG_RR and DG_Rn to be applied to image data corresponding to the pixels that make up each of the regions of interest ROI, using the reference detected value and the detected value input from the detecting section 413 and the above equations (1) and (2).

The conversion area controlling section 411b is configured to calculate white balance gains (an example of white balance gain control information) based on information of the luminance of each of a plurality of color pixels of each of a plurality of regions of interest ROI. The conversion area controlling section 411b is configured to calculate white balance gains WB_gref_R, WB_gref_G, and WB_gref_B (an example of white balance gain control information) of the reference region of interest, using the detected values DT_ref_R, DT_ref_G, and DT_ref_B input from the detecting section 413 and the above equations (7) through (9). Moreover, the conversion area controlling section 411b is configured to calculate white balance gains WB_g_Rn, WB_g_Gn, and WB_g_Bn (an example of white balance gain control information) of the other regions of interest ROI than the reference region of interest, using the detected values DT_Rn, DT_Gn, and DT_Bn input from the detecting section 413 and the above equations (10) through (12).

Furthermore, the conversion area controlling section 411b is configured to calculate final white balance gains (an example of a control value) LWB_g_Rn, LWB_g_Gn, and LWB_g_Rn for controlling white balance by adding, at a predetermined ratio, the white balance gains WB_gref_R, WB_gref_G, and WB_gref_B of the reference region of interest selected from the regions of interest ROI and the white balance gains WB_g_Rn, WB_g_Gn, and WB_g_Bn of the other regions of interest ROI than the reference region of interest. The conversion area controlling section 411b calculates final white balance gains LWB_g_Rn, LWB_g_Gn, and LWB_g_Rn using the predetermined coefficient α as the predetermined ratio, the calculated white balance gains WB_gref_R, WB_gref_G, and WB_gref_B, the calculated white balance gains WB_g_Rn, WB_g_Gn, and WB_g_Bn, and the above equations (13) through (15).

The conversion area controlling section 411b outputs the calculated digital gains DG_RR and DG_Rn and the calculated final white balance gains LWB_g_Rn, LWB_g_Gn, and LWB_g_Rn in association with the region numbers of the regions of interest ROI, together with information of the priority of the regions of interest, to an image quality adjustment processing section 42.

As illustrated in FIG. 14, the video receiving apparatus 4 includes the image quality adjustment processing section 42 that processes the adjustment of image quality of the plurality of ROIs using the image quality adjusting information extracted by the controlling section 41.

The image quality adjustment processing section 42 has an amplifying section 421 for amplifying image data input from the Cam CPU 411 with the digital gains DG_RR and DG_Rn calculated by the conversion area controlling section 411b. The amplifying section 421 amplifies the image data with the digital gains DG_RR and DG_Rn that are associated with the region numbers in conformity with the regions numbers associated with the image data. The amplifying section 421 outputs the image data amplified on the basis of the digital gains DG_RR and DG_Rn to an image generating section 422.

The image quality adjustment processing section 42 includes the image generating section 422 that performs a Raw process, an RGB process, and a YC process on the image data of the regions of interest ROI that have been amplified by the amplifying section 421.

When the image generating section 422 is supplied with image data input from the amplifying section 421, the image generating section 422 acquires information (ROI information) regarding a region of interest ROI including the image data from the Cam CPU 411 and generates an image of the region of interest ROI. For generating an image of the region of interest ROI, first, the image generating section 422 performs the Raw process to generate a region of interest ROI represented by a Raw image. Next, the image generating section 422 performs the RBG process to generate an image of the region of interest ROI represented by image data of RGB signals.

The image generating section 422 performs white balance control in the RGB process. Specifically, the image generating section 422 adjusts the white balance of the image data with the final white balance gains LWB_g_Rn, LWB_g_Gn, and LWB_g_Rn associated with the region number in conformity with the region number of the region of interest ROI represented by the image data of RGB signals. After having adjusted the white balance, the image generating section 422 performs color difference correction and the YC process such as noise reduction on image data of luminance and two color difference signals. The image generating section 422 outputs the image data of RGB signals of the region of interest ROI thus processed to an image quality adjusting section 423.

The image quality adjusting section 423 is configured to perform an inverse RGB process for converting image data of RGB signals input from the image generating section 422 into a luminance signal and two color difference signals. Moreover, the image quality adjusting section 423 is configured to perform a gamma correction process on image data that have been inverse-RGB-converted. Furthermore, the image quality adjusting section 423 is configured to perform color difference correction and the YC process such as noise reduction or the like on image data of luminance and two color difference signals. The image quality adjusting section 423 is configured to output an image whose image quality has been adjusted to a display device (not illustrated). The image where image defects have been corrected and image quality has been adjusted is thus displayed on the display device.

(Image Quality Adjustment Processing Method)

Figure 15:
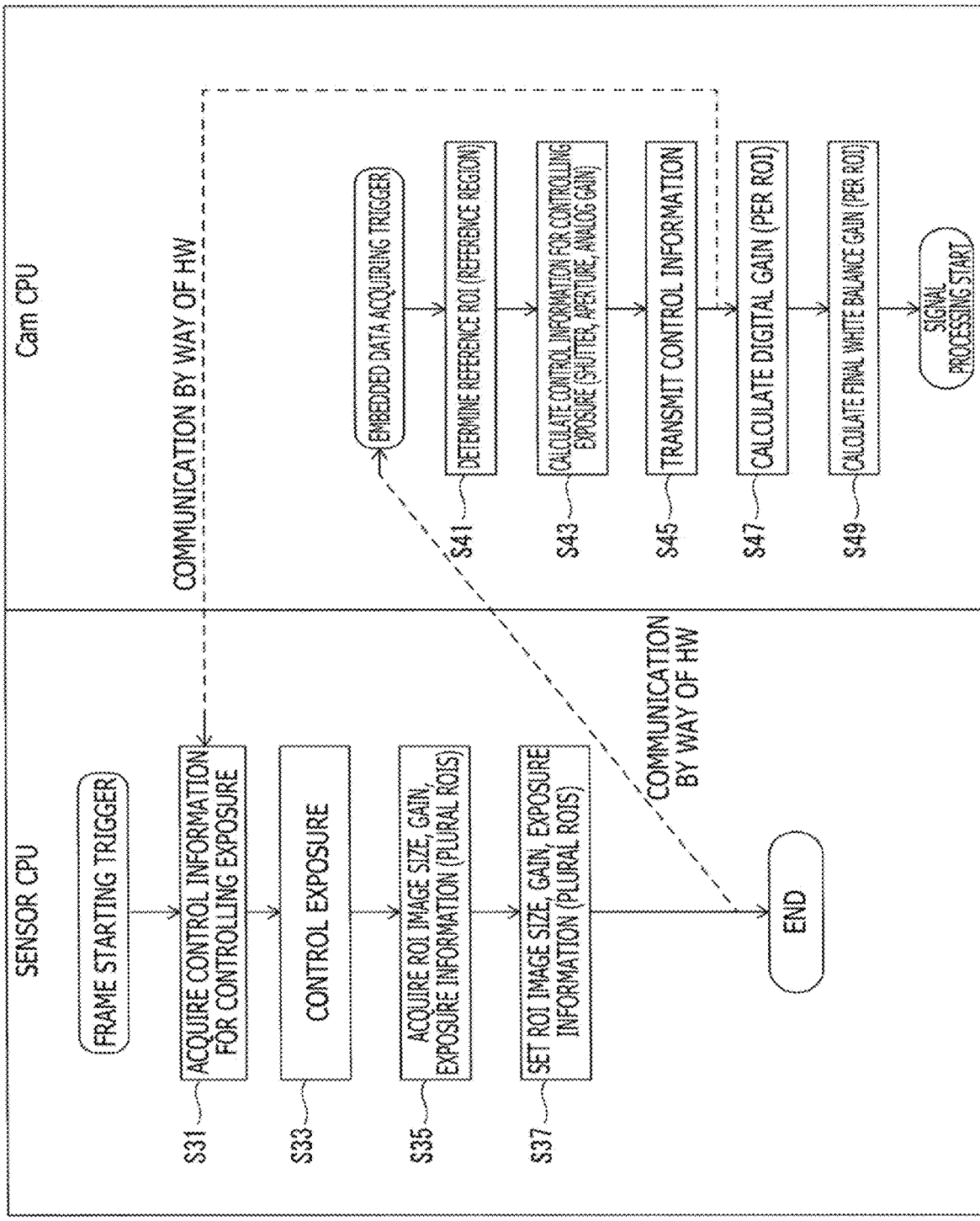
FIG. 15 is a flowchart illustrating an example of sequence of an image quality adjusting process in the transmitting apparatus, the receiving apparatus, and the transmission system according to the embodiment.

Next, an image quality adjustment processing method in the transmitting apparatus, the receiving apparatus, and the transmission system according to the present embodiment will be described below using FIG. 15 with reference to FIG. 14. FIG. 15 is a flowchart illustrating an example of sequence of an image quality adjusting process in the transmitting apparatus, the receiving apparatus, and the transmission system according to the present embodiment.

(Step S31)

As illustrated in FIG. 14, when the sensor CPU 321 included in the video transmitting apparatus 3 detects a frame starting trigger, the sensor CPU 321 acquires control information for controlling the image capturing section 31, and then goes to the processing of step S33. The control information acquired in step S31 is information sent out by the video receiving apparatus 4 and represents a shutter speed, an iris (lens aperture), a gain, etc.

(Step S33)

The sensor CPU 321 controls the image capturing section 31 on the basis of the acquired control information, and then goes to the processing of step S35. The image capturing section 31 thus captures an image of a target to be imaged on the basis of the newly established control information.

(Step S35)

The sensor CPU 321 acquires positional information, a gain, exposure information, luminance information, etc. of each of a plurality of regions of interest ROI established in the image capturing region of the image capturing section 31, and then goes to the processing of step S37.

(Step S37)

The sensor CPU 321 sets transmission data including ROI information that includes the positional information of each of the regions of interest ROI, the gain, the exposure information, the luminance information, etc. thereof, which are obtained in step S35, in the transmitting section 322, and then ends the image quality adjusting process.

The transmission data set in step S37 is transmitted from the video transmitting apparatus 3 to the video receiving apparatus 4 by way of communication through hardware (HW) using MIPI.

The receiving section 412 included in the video receiving apparatus 4 extracts the embedded data from the received transmission data and outputs the embedded data to the embedded data acquiring section 414. The embedded data acquiring section 414 decodes the embedded data input from the receiving section 412, acquires various pieces of information (for example, the number of regions of interest ROI, the region numbers and priority of the regions of interest ROI, the data lengths of the regions of interest ROI, the image format of the regions of interest ROI, etc.), and outputs the acquired various pieces of information to the Cam CPU 411.

(Step S41)

The Cam CPU 411, triggered by the timing at which the embedded data are decoded by the embedded data acquiring section 414, determines a reference region of interest on the basis of the various pieces of information acquired and input by the embedded data acquiring section 414 from the transmission data received by the receiving section 412, and then goes to the processing of step S43. In step S41, the Cam CPU 411 determines a region of interest whose image size is largest, for example, among a plurality of regions of interest ROI, as the reference region of interest.

(Step S43)

The Cam CPU 411 calculates exposure control information for controlling exposure from acquired information of the luminance of the reference region of interest, and then goes to the processing of step S45. The exposure controlling section 411a provided in the Cam CPU 411 calculates and acquires a shutter speed, an iris (lens aperture), a gain, an analog gain etc. as the exposure control information.

(Step S45)

The Cam CPU 411 sends out the exposure control information calculated in step S43 to the video transmitting apparatus 3, and then goes to the processing of step S47.

(Step S47)

The Cam CPU 411 calculates digital gains DG_RR and DG_Rn to be applied to image data corresponding to the pixels that make up each of the regions of interest ROI, using the reference detected value and the detected value input from the detecting section 413 and the above equations (1) and (2), and then goes to the processing of step S49.

(Step S49)

The Cam CPU 411 calculates final white balance gains LWB_g_Rn, LWB_g_Gn, and LWB_g_Rn using the predetermined coefficient α as the predetermined ratio, the calculated white balance gains WB_gref_R, WB_gref_G, and WB_gref_B, the calculated white balance gains WB_g_Rn, WB_g_Gn, and WB_g_Bn, and the above equations (13) through (15), and ends the image quality adjusting process.

With the video transmitting apparatus 3, the video receiving apparatus 4, and the transmission system 10 according to the present embodiment, the video receiving apparatus 4 is configured to determine a reference region of interest and to calculate a reference detected value and a detected value, a digital gain, an analog gain, and final white balance gains. With the transmitting apparatus, the receiving apparatus, and the transmission system according to the present embodiment, however, the transmitting apparatus may be configured to determine a reference region of interest and to calculate a reference detected value and a detected value, a digital gain, an analog gain, and final white balance gains.

In this case, the controlling section included in the transmitting apparatus may be configured to calculate a reference detected value and a detected value (both represent an example of a control value) for controlling a digital gain (an example of an amplification degree) of image data of a plurality of regions of interest ROI on the basis of the ratio between information of the luminance of a reference region of interest (an example of one ROI) selected from the regions of interest ROI and information of the luminance of the remainder of the regions of interest ROI (an example of a ROI).

In this case, furthermore, the controlling section included in the transmitting apparatus may be configured to calculate white balance gains (an example of a control value) for controlling final white balance gains by adding, at a predetermined ratio, white balance control information of a reference region of interest (an example of one ROI) selected from a plurality of regions of interest and white balance control information of the luminance of the remainder of the regions of interest (an example of a ROI).

In other words, the controlling section 32 may be configured to perform the similar functions to the conversion area controlling section 411b and the detecting section 413 (see FIG. 14). Moreover, the video transmitting apparatus 3 may send out a digital gain and final white balance gains in association with regions of interest to the video receiving apparatus 4. In this case, the video receiving apparatus 4, even if it lacks the conversion area controlling section 411b and the detecting section 413, can apply a digital gain and white balance to image data with the image quality adjustment processing section 42 using information including the digital gain, the final white balance gains, the ROI information, and the image data sent out from the video transmitting apparatus 3.

4. Modification of the Embodiment of the Present Disclosure

Figure 16:
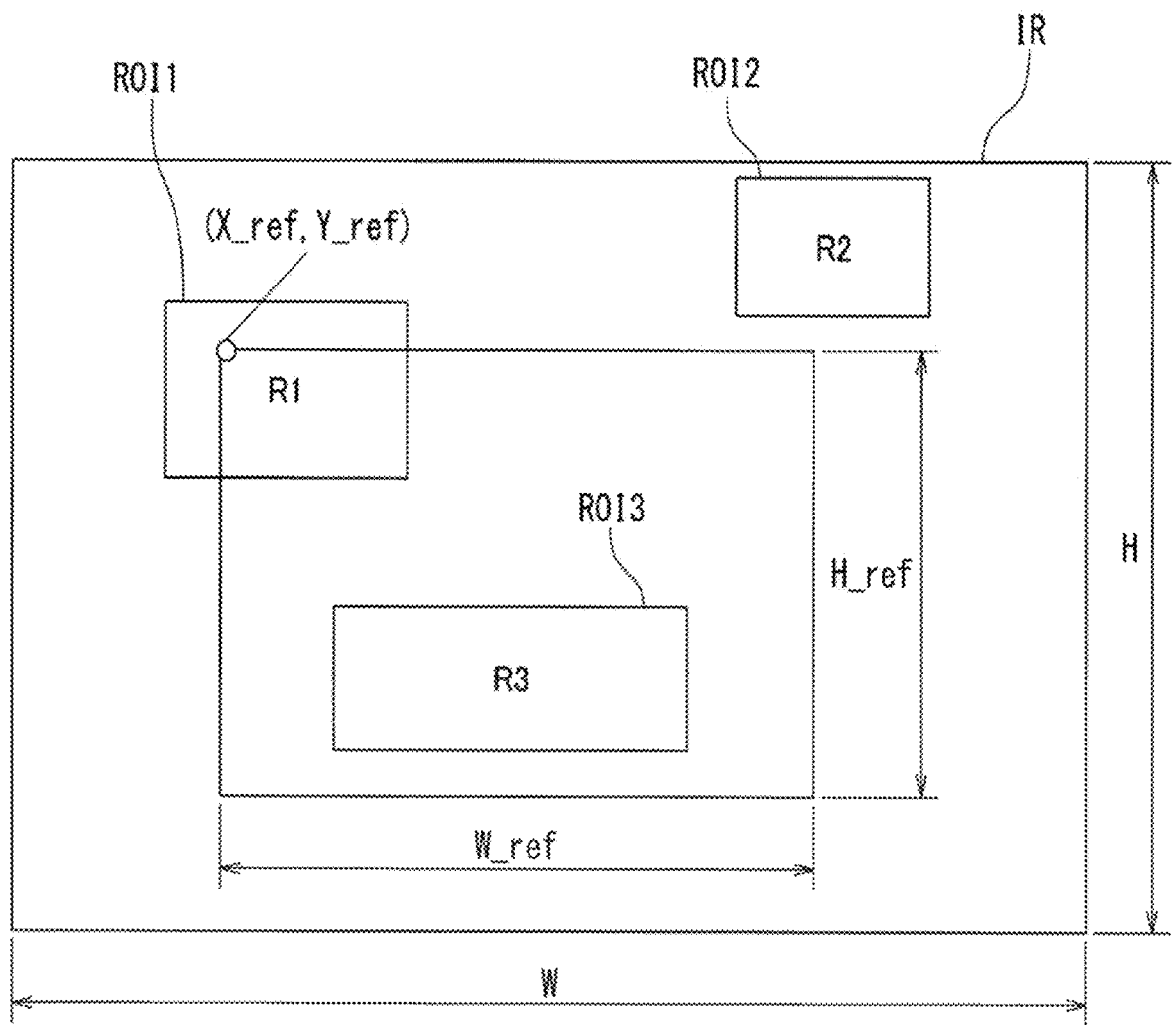
FIG. 16 is a diagram illustrating the principles of an image quality adjusting process according to a modification of the embodiment.

Next, a transmitting apparatus, a receiving apparatus, and a transmission system according to a modification of the present embodiment will be described below using FIG. 16. FIG. 16 is a diagram illustrating the principles of an image quality adjusting process according to the present modification. The present modification is different from the above embodiment as to a method of determining a reference region of interest.

According to the present modification, as illustrated in FIG. 16, a reference region Rr for selecting a reference region of interest is designated. The reference region Rr has an oblong rectangular shape, for example. The reference region Rr has left upper coordinates set to (X_ref, Y_ref), for example, and a size (region size) set to (W_ref×H_ref).

Next, a region of interest whose central coordinates exist in the reference region Rr is extracted as a reference region of interest. For example, in a case where the center of a region of interest has an X coordinate larger than the X coordinate (X_ref) of the reference region Rr and smaller than an X coordinate represented by the sum of the X coordinate (X_ref) of the reference region Rr and the region size (W_ref) in the X-axis directions of the reference region Rr, and the center of the region of interest has a Y coordinate larger than the Y coordinate (Y_ref) of the reference region Rr and smaller than an Y coordinate represented by the sum of the Y coordinate (Y_ref) of the reference region Rr and the region size (H_ref) in the Y-axis directions of the reference region Rr, the region of interest is extracted as a reference region of interest. In the example illustrated in FIG. 16, a region of interest ROI1 and a region of interest ROI3 are extracted as reference regions of interest whose central coordinates exist in the reference region Rr.

According to automatic exposure control, a reference detected value L_ref is calculated using information of the luminance of the pixels that make up a reference region of interest. In a case where a plurality of reference regions of interest is extracted, an average value of the reference detected values of the respective reference regions of interest may be regarded as a reference detected value L_ref. Moreover, the calculated reference detected value may be weighted depending on the distances between the central point of the reference region Rr and the central points of the reference regions of interest. In this case, a larger coefficient is assigned to the reference detected value as the distance becomes smaller. Furthermore, the calculated reference detected value may be weighted depending on the area where the reference regions of interest are included in the reference region Rr. In this case, a larger coefficient is assigned to the reference detected value as the area becomes larger.

Digital gains of the reference region of interest and regions of interest other than the reference region of interest are calculated using the calculated reference detected value L_ref and the equations (1) and (2) described above.

According to automatic white balance control, a detected value DT_ref_R of R pixels, a detected value DT_ref_G of G pixels, and a detected value DT_ref_B of B pixels are calculated using information of the luminance of the respective R pixels, G pixels, and B pixels that make up a reference region of interest. In a case where a plurality of reference regions of interest is extracted, average values of the detected values of the respective colors of the reference regions of interest may be regarded as detected values DT_ref_R, DT_ref_G, and DT_ref_B. The calculated reference detected values may be weighted depending on the distances between the central point of the reference region Rr and the central points of the reference regions of interest. In this case, a larger coefficient is assigned to the detected value as the distance becomes smaller. Furthermore, the calculated reference detected value may be weighted depending on the area where the reference regions of interest are included in the reference region Rr. In this case, a larger coefficient is assigned to the detected value as the area becomes larger.

Final white balance gains of the reference region of interest and the regions of interest other than the reference region of interest are calculated using the calculated detected values DT_ref_R, DT_ref_G, and DT_ref_B and the equations (7) through (15) described above.

The present modification is similar to the above embodiment except that it has a different method of calculating a reference detected value in the automatic exposure control process and detected values in the automatic white balance control process. Therefore, the transmitting apparatus, the receiving apparatus, and the transmission system according to the present modification can be of the similar configuration to the video transmitting apparatus 3, the video receiving apparatus 4, and the transmission system 10 according to the above embodiment, and will be omitted from description.

As described above, the transmitting process, the receiving process, and the transmission system according to the present embodiment and the present modification is capable of performing an image quality adjusting process (e.g., an automatic exposure control process and an automatic white balance control process) on a partial region of interest (ROI) segmented from a captured image.

The present disclosure is not limited to the above embodiment, but can be modified in various ways.

The above embodiment and modification have been described with respect to an object as a segmentation target that is of a rectangular shape, for example. However, an image quality adjusting process (e.g., an automatic exposure control process and an automatic white balance control process) can be performed in a case where an object as a segmentation target is not of a rectangular shape. For example, the video transmitting apparatus 3 may include the positional information and luminance of a target object in the payload per pixel row and send out them to the video receiving apparatus 4, as is the case with the presupposed technology 2. Since information of the luminance of the pixels and color pixels that make up a region of interest ROI is thus obtained, a digital gain in the automatic exposure control process and final white balance gains in the automatic white balance control process can be calculated.

According to the above embodiment and modification, the conversion area controlling section (an example of a controlling section) 321b is configured to select a region of interest ROI whose size (image size) is largest or a region of interest ROI whose central coordinates exist in the reference region Rr as a reference region of interest (an example of one ROI). However, the present disclosure is not limited to such details. For example, the conversion area controlling section 321b may select a reference region of interest on the basis of some or all of the x coordinates or y coordinates of respective left upper pixels or the respective lengths in the x-axis directions or the respective lengths in the y-axis directions of a plurality of regions of interest ROI.

A region of interest whose distance from the segmented position to the central position of the image capturing region IR is shortest may be selected as a reference region of interest.

A plurality of regions of interest may be selected as reference regions of interest.

In a case where detected information (average pixel value) can be acquired from the image capturing section, the detected information may be regarded as a reference detected value. In this case, a reference region of interest may not be established.

An overall image captured by the image capturing section may be sent at intervals of 1/N frame and may be selected as reference regions of interest.

A reference region of interest may be determined on the basis of the relationship between an image in a preceding frame and an image in a present frame. For example, of a plurality of regions of interest included in the present frame, a region of interest that is closest, for example, to the reference region of interest in the preceding frame may be selected as a reference region of interest.

In automatic exposure control, automatic white balance control, and AE control, regions of interest that are different from each other according to independent standards may be selected as reference regions of interest.

The present disclosure has been described above with respect to the presupposed technologies, the embodiment, and the modification thereof. However, the present disclosure is not limited to the above embodiment, etc., but various changes and modifications may be made therein. Incidentally, the advantages set forth in the present description are given by way of illustrative example only. The advantages of the present disclosure are not limited to those set forth in the present description. The present disclosure may have other advantages than the advantages set forth in the present description.

Furthermore, the present disclosure may have the following arrangements, for example:

(1)

A transmitting apparatus including:
  a controlling section that controls acquisition of image quality adjusting information including information for use in adjusting image quality of each of a plurality of ROIs (Regions of Interest); and
  a transmitting section that sends out image data of the plurality of ROIs as payload data and sends out ROI information of each of the plurality of ROIs as embedded data.

(2)

The transmitting apparatus according to (1), in which the image quality adjusting information is included in the ROI information and sent out from the transmitting section.

(3)

The transmitting apparatus according to (1) or (2), in which the controlling section acquires information of luminance of each of the plurality of ROIs as the image quality adjusting information.

(4)

The transmitting apparatus according to (3), in which the controlling section acquires exposure control information for controlling exposure from the image quality adjusting information of one ROI selected from the plurality of ROIs.

(5)

The transmitting apparatus according to (4), in which the controlling section calculates a control value for controlling the amplification degree of the image data of the plurality of ROIs on the basis of the ratio between information of the luminance of the one ROI and information of the luminance of the remainder of the plurality of ROIs.

(6)

The transmitting apparatus according to any one of (1) through (5), in which
the ROIs have a plurality of color pixels arrayed according to predetermined rules, and
the controlling section calculates white balance control information based on information of luminance of each of the plurality of color pixels.

(7)

The transmitting apparatus according to (6), in which the controlling section calculates a control value for controlling white balance by adding, at a predetermined ratio, the white balance control information of one ROI selected from the plurality of ROIs and white balance control information of remaining ROIs.

(8)

The transmitting apparatus according to any one of (1) through (7), in which the transmitting section sends out a signal according to MIPI (Mobile Industry Processor Interface) D-PHY standards, MIPI C-PHY standards, or MIPI CSI (Camera Serial Interface)-2 standards.

(9)

A receiving apparatus including:
a receiving section that receives a transmission signal including image data of a plurality of ROIs (Regions Of Interest) in payload data and including ROI information of each of the plurality of ROIs in embedded data;
a controlling section that controls extraction of image quality adjusting information including information for use in adjusting image quality of the plurality of ROIs from the transmission signal received by the receiving section; and
a processing section that performs an adjustment of the image quality of the plurality of ROIs using the image quality adjusting information extracted by the controlling section.

(10)

The receiving apparatus according to (9), in which the controlling section extracts the image quality adjusting information from the ROI information included in the transmission signal.

(11)

The receiving apparatus according to (9) or (10), in which the controlling section extracts information of luminance of each of the plurality of ROIs as the image quality adjusting information.

(12)

The receiving apparatus according to (11), in which the controlling section extracts exposure control information for controlling exposure from the image quality adjusting information of one ROI selected from the plurality of ROIs.

(13)

The receiving apparatus according to (12), in which the controlling section selects the one ROI on the basis of some or all of the x coordinates or y coordinates of respective left upper pixels or the respective lengths in x-axis directions or the respective lengths in y-axis directions of the plurality of ROIs.

(14)

The receiving apparatus according to (12), in which the controlling section calculates a control value for controlling the amplification degree of the image data of the plurality of ROIs on the basis of a ratio between information of the luminance of the one ROI and information of the luminance of the remainder of the plurality of ROIs.

(15)

The receiving apparatus according to any one of claims (9) through (14), in which
the ROIs have a plurality of color pixels arrayed according to predetermined rules, and
the controlling section calculates white balance control information based on information of luminance of each of the plurality of color pixels.

(16)

The receiving apparatus according to (15), in which the controlling section calculates a control value for controlling white balance by adding, at a predetermined ratio, the white balance control information of one ROI selected from the plurality of ROIs and white balance control information of remaining ROIs.

(17)

The receiving apparatus according to any one of (9) through (16), in which the receiving section receives a signal according to MIPI (Mobile Industry Processor Interface) D-PHY standards, MIPI C-PHY standards, or MIPI CSI (Camera Serial Interface)-2 standards.

(18)

A transmission system including:
a transmitting apparatus including a controlling section that controls acquisition of image quality adjusting information including information for use in adjusting image quality of each of a plurality of ROIs (Regions of Interest), and a transmitting section that sends out image data of the plurality of ROIs as payload data and sends out ROI information of each of the plurality of ROIs as embedded data; and
a receiving section that receives a transmission signal including image data of a plurality of ROIs (Regions Of Interest) in payload data and including ROI information of each of the plurality of ROIs in embedded data, a controlling section that controls extraction of image quality adjusting information including information for use in adjusting image quality of the plurality of ROIs from the transmission signal received by the receiving section, and a processing section that performs an adjustment of the image quality of the plurality of ROIs using the image quality adjusting information extracted by the controlling section.

It will be understood that those skilled in the art can anticipate various corrections, combinations, sub-combinations, and changes depending on design requirements and other factors as falling within the scope of attached claims and the scope of their equivalents.

REFERENCE SIGNS LIST

10: Video transmission system
3, 100: Video transmitting apparatus
4, 200: Video receiving apparatus
31, 110: Image capturing section
32, 41, 33: Controlling section
34: Nonvolatile storage section
42: Image quality adjustment processing section
100A: CSI transmitter
100B: CCI slave
111: Captured image
112, 112a1, 112a2, 112a3, 112a4, 112b1, 112b4, 123a4, 223A: ROI image
112b: Compressed image data
113, 114: Positional information
115: Priority
116, 116a1, 116a2: Transmission image
118: Image
120, 130: Image processing section
120A, 120A1, 120A2, 130A, 147B: Compressed image data
120B: ROI information
120C: Frame information
121: ROI segmenting section
122: ROI analyzing section
123: Detecting section
124: Priority setting section
125, 131: Encoding section
126: Image processing controlling section
140: Transmitting section
141: LINK controlling section
142: ECC generating section
143: PH generating section
144, 145: ROI data buffer
144: EBD buffer
146: Normal image data buffer
147: Combining section
147A: Transmission data
200A: CSI receiver
200B: CCI master
210: Receiving section
211: Header separating section
212: Header interpreting section
213: Payload separating section
214: EBD interpreting section
214A: EBD data
215: ROI data separating section
215A, 215B: Payload data
220: Information processing section
221: Information extracting section
221A: Extracted information
222: ROI decoding section
222A: Image data
223: ROI image generating section
224: Normal image decoding section
224A: Normal image
311: Photoelectric converting section
312: Signal converting section
313, 421: Amplifying section
321: Sensor CPU
321a, 411a: Exposure controlling section
321b, 411b: Conversion area controlling section
322: Transmitting section
411: Cam CPU
412: Receiving section
413: Detecting section
414: Embedded data acquiring section
422: Image generating section
423: Image quality adjusting section

The invention claimed is:

1. A transmitting apparatus comprising:
a controlling section that controls acquisition of image quality adjusting information including information for use in adjusting image quality of each of a plurality of ROIs (Regions of Interest); and
a transmitting section that sends out image data of the plurality of ROIs as payload data and sends out ROI information of each of the plurality of ROIs as embedded data.

2. The transmitting apparatus according to claim 1, wherein the image quality adjusting information is included in the ROI information and sent out from the transmitting section.

3. The transmitting apparatus according to claim 1, wherein the controlling section acquires information of luminance of each of the plurality of ROIs as the image quality adjusting information.

4. The transmitting apparatus according to claim 3, wherein the controlling section acquires exposure control information for controlling exposure from the image quality adjusting information of one ROI selected from the plurality of ROIs.

5. The transmitting apparatus according to claim 4, wherein the controlling section calculates a control value for controlling an amplification degree of the image data of the plurality of ROIs on a basis of a ratio between information of the luminance of the one ROI and information of the luminance of the remainder of the plurality of ROIs.

6. The transmitting apparatus according to claim 1, wherein
the ROIs have a plurality of color pixels arrayed according to predetermined rules, and
the controlling section calculates white balance control information based on information of luminance of each of the plurality of color pixels.

7. The transmitting apparatus according to claim 6, wherein the controlling section calculates a control value for controlling white balance by adding, at a predetermined ratio, the white balance control information of one ROI selected from the plurality of ROIs and white balance control information of remaining ROIs.

8. The transmitting apparatus according to claim 1, wherein the transmitting section sends out a signal according to MIPI (Mobile Industry Processor Interface) D-PHY standards, MIPI C-PHY standards, or MIPI CSI (Camera Serial Interface)-2 standards.

9. A receiving apparatus comprising:
a receiving section that receives a transmission signal including image data of a plurality of ROIs (Regions Of Interest) in payload data and including ROI information of each of the plurality of ROIs in embedded data;
a controlling section that controls extraction of image quality adjusting information including information for use in adjusting image quality of the plurality of ROIs from the transmission signal received by the receiving section; and
a processing section that performs an adjustment of the image quality of the plurality of ROIs using the image quality adjusting information extracted by the controlling section.

10. The receiving apparatus according to claim 9, wherein the controlling section extracts the image quality adjusting information from the ROI information included in the transmission signal.

11. The receiving apparatus according to claim 9, wherein the controlling section extracts information of luminance of each of the plurality of ROIs as the image quality adjusting information.

12. The receiving apparatus according to claim 11, wherein the controlling section extracts exposure control information for controlling exposure from the image quality adjusting information of one ROI selected from the plurality of ROIs.

13. The receiving apparatus according to claim 12, wherein the controlling section selects the one ROI on a basis of some or all of x coordinates or y coordinates of respective left upper pixels or respective lengths in x-axis directions or respective lengths in y-axis directions of the plurality of ROIs.

14. The receiving apparatus according to claim 13, wherein the controlling section calculates a control value for controlling an amplification degree of the image data of the plurality of ROIs on a basis of a ratio between information of the luminance of the one ROI and information of the luminance of the remainder of the plurality of ROIs.

15. The receiving apparatus according to claim 9, wherein
the ROIs have a plurality of color pixels arrayed according to predetermined rules, and
the controlling section calculates white balance control information based on information of luminance of each of the plurality of color pixels.

16. The receiving apparatus according to claim 15, wherein the controlling section calculates a control value for controlling white balance by adding, at a predetermined ratio, the white balance control information of one ROI selected from the plurality of ROIs and white balance control information of remaining ROIs.

17. The receiving apparatus according to claim 9, wherein the receiving section receives a signal according to MIPI (Mobile Industry Processor Interface) D-PHY standards, MIPI C-PHY standards, or MIPI CSI (Camera Serial Interface)-2 standards.

18. A transmission system comprising:

a transmitting apparatus including a controlling section that controls acquisition of image quality adjusting information including information for use in adjusting image quality of each of a plurality of ROIs (Regions of Interest), and a transmitting section that sends out image data of the plurality of ROIs as payload data and sends out ROI information of each of the plurality of ROIs as embedded data; and a receiving section that receives a transmission signal including image data of a plurality of ROIs (Regions Of Interest) in payload data and including ROI information of each of the plurality of ROIs in embedded data, a controlling section that controls extraction of image quality adjusting information including information for use in adjusting image quality of the plurality of ROIs from the transmission signal received by the receiving section, and a processing section that performs an adjustment of the image quality of the plurality of ROIs using the image quality adjusting information extracted by the controlling section.

* * * * *